United States Patent [19]

Nishioka et al.

[11] Patent Number: 6,041,408
[45] Date of Patent: Mar. 21, 2000

[54] KEY DISTRIBUTION METHOD AND SYSTEM IN SECURE BROADCAST COMMUNICATION

[75] Inventors: Mototsugu Nishioka, Kawasaki; Hisashi Umeki, Yokohama; Susumu Matsui, Machida, all of Japan

[73] Assignee: Hitachi, Ltd., Tokyo, Japan

[21] Appl. No.: 08/882,339

[22] Filed: Jun. 25, 1997

[30] Foreign Application Priority Data

Jun. 28, 1996 [JP] Japan ................................. 8-168975
Aug. 9, 1996 [JP] Japan ................................. 8-210811
Aug. 19, 1996 [JP] Japan ................................. 8-217050
Oct. 11, 1996 [JP] Japan ................................. 8-269613

[51] Int. Cl.[7] .................................................. H04K 1/00
[52] U.S. Cl. .......................... 713/171; 713/162; 713/163; 380/262; 380/278; 380/279; 380/280; 380/283; 380/284
[58] Field of Search .................................. 713/162, 163, 713/171; 380/262, 278–280, 283, 284

[56] References Cited

U.S. PATENT DOCUMENTS

| | | | |
|---|---|---|---|
| 4,850,017 | 7/1989 | Matayas et al. | 380/21 |
| 5,369,705 | 11/1994 | Bird et al. | 380/21 |
| 5,592,552 | 1/1997 | Fiat | 380/21 |
| 5,663,896 | 9/1997 | Aucsmith | 395/187.01 |
| 5,708,714 | 1/1998 | Lopez et al. | 380/25 |
| 5,729,608 | 3/1998 | Janson et al. | 380/21 |

OTHER PUBLICATIONS

*The Transactions of The Institute of Electronics, Information and Communication Engineers,* "Subscriber–Individual Encrytion System for Pay–Television Service", M. Akiyama, et al., vol. J75–B–I, No. 1, 1992.

*The Institute of Electronics, Information and Communication Engineers,* "Note on the Key Distribution for the Secure Broadcast Communication Systems", M. Nishioka, vol. 96, 365.

*The Institute of Electronics, Information and Communication Engineers,* "Efficient Secure Broadcast Communication System", M. Mambo, et al., vol. 93, No. 295.

IEEE Trans. Commun., COM–29, No. 6, pp. 778–786, 1981.

Trans. IEICE, J65–D, No. 9, pp. 1151–1158, 1982.

Lee et al., SCIS86, 1986.

IEICE Technical Report, ISEC93–34, Oct. 1993.

Commun. of the ACM, vol. 21, No. 2, pp. 120–126, 1987.

*Primary Examiner*—Tod R. Swann
*Assistant Examiner*—Paul E. Callahan
*Attorney, Agent, or Firm*—Antonellio, Terry, Stout & Kraus, LLP

[57] ABSTRACT

A key distribution method and system are disclosed in which a sender and receivers share a common key information for performing a secure broadcast communication. By use of a center side apparatus, a center generates key information of a receiver in association with a subset inclusive of two or more elements of a proper finite set S1 on the basis of a space determined by a subset inclusive of two or more elements of another finite set S2. A sender side apparatus, a sender makes the multi-address transmission of key distribution data W inclusive of data generated corresponding to each element of the finite set S1 and data generated corresponding to a set of plural receivers through a communication network. By use of a receiver side apparatus, a receiver generates common key information between the sender and the receiver from the key distribution data W and the key information of the receiver.

42 Claims, 8 Drawing Sheets

FIG.11

[KEY GENERATION]  CONFIDENTIAL INFORMATION OF CENTER

| $a_1$ | $a_2$ | $a_3$ | ... | $a_m$ |

↓ SELECT k INFORMATION

GENERATE KEY INFORMATION
$K_x$ OF ENTITY x

COMBINATION SELECTING k INFORMATION FROM AMONG m INFORMATION : $\binom{m}{k} = \dfrac{m!}{(m-k)!\,k!}$

| $a_1$ | $a_2$ | $a_3$ | ... | $a_m$ |
| ↓ | ↓ | ↓ | | ↓ |

PUBLIC INFORMATION OF CENTER

| $b_1$ | $b_2$ | $b_3$ | ... | $b_m$ |

[KEY DISTRIBUTION]

SENDER

| $b_1$ | $b_2$ | $b_3$ | ... | $b_m$ |

RANDOM NUMBER r →
↓ ↓ ↓ ↓

| $c_1$ | $c_2$ | $c_3$ | ... | $c_m$ |

⇩ MULTI-ADDRESS TRANSMISSION

RECEIVER

| $c_1$ | $c_2$ | $c_3$ | ... | $c_m$ |

↓ SELECT k INFORMATION

CALCULATE COMMON KEY K BY USE
OF KEY INFORMATION $K_x$ OF ENTITY x

KEY DISTRIBUTION METHOD AND SYSTEM IN SECURE BROADCAST COMMUNICATION

BACKGROUND OF THE INVENTION

The present invention relates to a key distribution method and system in secure broadcast communication.

Up to now, several methods have been proposed in regard to secure broadcast communication (or key management).

For example, a copied key method disclosed by S. J. Kent, "Security requirement and protocols for a broadcast scenario", IEEE Trans. Commun., COM-29, 6, pp. 778–786 (1981) is fundamental. The copied key method is the simple extension of the conventional one-to-one cryptographic individual communication to a multi-address communication. The copy of one kind of key is distributed to a sender and a plurality of normal receivers. The sender enciphers information by use of the copied key and transmits the enciphered information. The normal receiver deciphers the information by use of the same copied key.

The other methods include (i) a secure broadcast communication method disclosed by K. Koyama, "A Cryptosystem Using the Master Key for Multi-Address Communication", Trans. IEICE, J65-D, 9, pp. 1151–1158 (1982) which uses a master key alternative to RSA individual key, (ii) a key distribution system disclosed by Lee et al., "A Multi-Address Communication Using a Method of Multiplexing and Demultiplexing", the Proc. of the 1986 Symposium on Cryptography and Information Security, SCIS86 (1986) which is based on the multiplexing and demultiplexing of information trains using the Chinese reminder theorem, and (iii) a system disclosed by Mambo et al., "Efficient Secure Broadcast Communication Systems", IEICE Technical Report, ISEC93-34 (October 1993).

According to the system for performing the multiplexing and demultiplexing of information trains by use of the Chinese reminder theorem, the following processes are performed.

(1) Key Generating Process

For a receiver $i$ ($1 \leq i \leq r$) are generated $s$ coprime integers $g_1, g_2, \ldots, g_s$ ($r \leq s$) and $g_i$ is distributed to the receiver $i$ as confidential information of the receiver $i$ beforehand.

(2) Enciphering Process

It is assumed that s information trains to be multiplexed are $M_1, M_2, \ldots, M_s$. A sender calculates a multiplexed transmit sentence F in accordance with $$F = \sum_{i=1}^{k} A_i G_i M_i \bmod G$$

and makes the multi-address transmission of F, wherein G, $G_i$ and $A_i$ are the least integer $A_i$ which satisfies $$G = \prod_{i=1}^{k} g_i,$$

$G_i = G/g_i$,
$A_i G_i \equiv 1 \pmod{g_i}$.

(3) Deciphering Process

The receiver $i$ demultiplexes $M_i$ from F by use of $g_i$ in accordance with $M_i = F \bmod g_i$ According to the system disclosed by Mambo et al., "Efficient Secure Broadcast Communication Systems", IEICE Technical Report, ISEC93-34 (October 1993), the following processes are performed.

(1) Key Generating Process

A reliable center generates the following information.
Confidential information:
P=2p+1,Q=2q+1:prime number (p,q:prime number)
$e_i \in Z, 0 < e_i < L$ ($1 \leq i \leq m$)
Public information:
$g \in Z$, $0 < g < N$
N=PQ
$v_i = g^{e_i} \bmod N$ ($1 \leq i \leq m$).
The center calculates so satisfying $$S_\sigma = \sum_{i=1}^{k} e_{\sigma(i)} \equiv 1 \pmod{L}$$

for $\sigma \in S$ and distributes $s_\sigma$ as confidential information of a receiver $U_\sigma$, wherein set S={f|one-to-one map f:A={1, 2, ..., k}→B={1, 2, ..., m}, m>k}.

(2) Key Distribution Process (i) A sender randomly selects an integer $r$ to calculate $z_i = v_i^r \bmod N$ ($1 \leq i \leq m$)

with the object of sharing a common key $K = g^r \bmod N$ in common with the receiver and makes the multi-address transmission of $z_i$ ($1 \leq i \leq m$).

(ii) The receiver $U_\sigma$ calculates the common key K in accordance with $$K = \left( \prod_{i=1}^{k} z_{\sigma(i)} \right)^{s_\sigma} \bmod N.$$

In the above-mentioned key distribution based on the multiplexing method using the Chinese reminder theorem, the length of key distribution data becomes large in proportion to the number of receivers since the key distribution data for individual users are transmitted in a serially arranged manner. This offers a problem from an aspect of efficiency in the case where several millions of receivers are made an object as in a broadcasting satellite service.

On the other hand, in the system disclosed by Mambo et al., "Efficient Secure Broadcast Communication Systems", IEICE Technical Report, ISEC93-34 (October 1993), the length of key distribution data can be reduced even in the case where the number of receivers is large. However, this system has a problem in security that if receivers conspire with each other, confidential information of another receiver can be calculated. Also, it is not possible to possess a key in common with only receivers which belong to any set of receivers.

SUMMARY OF THE INVENTION

Therefore, a principal object of the present invention is to provide a key distribution method and system for secure broadcast communication having the following features:

(1) receivers possess individual confidential key information to share a data enciphered key between the receivers;

(2) even in the case where the number of receivers is large, it is possible to reduce the length of key distribution data;

(3) even if receivers club their confidential information in conspiracy with each other, it is difficult to calculate key information of another receiver and confidential information of a key generator; and (4) it is possible to possess the data enciphered key in common with only receivers which belong to any set of receivers.

To that end, a key generator generates a finite set S including a plurality of confidential information of the key generator and a finite set P including public information of the key generator, generates confidential key information s(x) of a receiver $\underline{x}$ from elements of a subset $S_x$ of the confidential information S on a space determined by a subset $V_x$ of the set S or P, and distributes the key information s(x) to the receiver $\underline{x}$. A sender performs an operation of adding random numbers to elements in the public information corresponding to the elements of the set S and makes the multi-address transmission of a set R(P) including the elements which result from the operation. The receiver $\underline{x}$ selects a set R(P, x) of elements corresponding to $S_x$ from R(P) to calculate a common key between the sender and the receiver from each element of R(P, x) and the confidential key information s(x). The common key corresponds to a data enciphered key.

According to a method for possessing a key in common with only receivers which belong to any set of receivers (in this case, a broadcasting station is a key generator and a sender), the broadcasting station generates confidential key information s(x) of a receiver $\underline{x}$ from a subset $S_x$ of a finite set S including a plurality of elements and distributes the key information s(x) to the receiver $\underline{x}$. The broadcasting station performs an operation of adding an arbitrarily selected random number to each element of a set P including values corresponding to the elements of the set S and makes the multi-address transmission of a set R(P) including the elements which result from the operation. The broadcasting station further transmits to only the limited receiver a value t(x) characteristic of the receiver $\underline{x}$ which corresponds to the confidential key information s(x) of the receiver $\underline{x}$. The receiver $\underline{x}$ selects a set R(P, x) of elements corresponding to $S_x$ from R(P) to calculate a common key between the broadcasting station and the receiver from the elements of R(P, x), the key information s(x) and the value t(x) of the receiver $\underline{x}$.

In the following, mention will be made of a specific realizing example of a method in which the length of key distribution data is short even in the case of a large number of receivers and the security against the conspiracy attack of receivers is improved.

As a preparatory process, a key generator generates

P,Q:prime number $e_i \in Z, 0 < e_i < L = \text{lcm}(P-1, Q-1)$ $(1 \leq i \leq m)$ as confidential information of the key generator and generates

N=PQ $g_i \in Z, 0 < g_i < N$ $(1 \leq j \leq n)$ $u_{ij} = g_j^{e_i} \mod N$ $(1 \leq i \leq m, 1 \leq j \leq n)$ n=kl, k,l $(>0) \in Z$ as public information of the key generator.

Further, the key generator calculates $S_{x,(\pi,\sigma)} = (S_{x,\pi_1(1)}, \ldots, S_{x,\pi_1(h)}, \ldots, S_{x,\pi_l(1)}, \ldots, S_{x,\pi_l(h)})$ satisfying $$\sum_{j=1}^{h} S_{x,\pi_i(j)} e_{\pi_i(j)} \equiv 1 \pmod{L_{\sigma_i}} \ (1 \leq i \leq l)$$

for $\pi = (\pi_1, \ldots, \pi_l) \in R_{k,n}$, $\sigma = (\sigma_1, \ldots, \sigma_l) \in S_{k,n}$ and distributes $S_{x,(\pi,\sigma)}$ as key information of a receiver $\underline{x}$. Therein, $$L_{\sigma_i} = \text{ord}_N \left( \prod_{j=1}^{k} g_{\sigma_i(j)} \right) \ (1 \leq i \leq l)$$

Also, when $\sigma = (\sigma_1, \ldots, \sigma_l), \sigma' = (\sigma'_1, \ldots, \sigma'_l) \in S'_{k,n}$ for set $R_{k,n} = \{\pi = (\pi_1, \ldots, \pi_l) | \text{one-to-one map } \pi_i : \{1, 2, \ldots, h\} \to \{1, 2, \ldots, m\} (1 \leq i \leq l, 1 \leq h \leq m)\}$, set $S'_{k,n} = \{\sigma = (\sigma_1, \ldots, \sigma_l) | \text{one-to-one map } \sigma_i : A = \{1, 2, \ldots, k\} \to B = \{1, 2, \ldots, n\} (1 \leq i \leq l), \sigma_1(A) \cup \ldots \cup \sigma_l(A) = B\}$, a relation $$\sigma \sim \sigma' \overset{\text{def}}{\Longleftrightarrow} \sigma_i(A) = \sigma'_{\tau(i)}(A) \ (1 \leq i \leq l)$$

is defined in regard to a proper permutation $\underline{\tau}$ on a set $\{1, 2, \ldots, l\}$. At this time, "~" represents an equivalent relation on $S'_{k,n}$ and $S_{k,n}$ is $S_{k,n} = S'_{k,n}/\sim$.

As a key distribution process, (1) a sender randomly selects an integer $\underline{r}$ to calculate $y_{ij} = u_{ij}^r \mod N$ $(1 \leq i \leq m; 1 \leq j \leq n)$ from the public information with the object of sharing a common key K $$K = \prod_{i=1}^{n} g_i^r \mod N$$

and makes the multi-address transmission of $y_{ij}$.

(2) The receiver $\underline{x}$ calculates the common key K in accordance with $$K = \prod_{i=1}^{l} \prod_{p=1}^{h} \prod_{q=1}^{k} y_{\pi_i(p)\sigma_i(q)}^{S_{x,\pi_i(p)}} \mod N$$

wherein Z represents a set of the whole of integers, lcm(a,b) represents the lowest common multiple of integers $\underline{a}$ and $\underline{b}$, and the least positive integer $\underline{x}$ satisfying $g^x \equiv 1 \pmod{N}$ for an integer N is represented by $\text{ord}_N(g)$.

According to the key distribution method of the present invention, the length of key distribution data can be reduced even in the case where the number of receivers is large. Also, even if unfair receivers club their confidential information, it is difficult to perform irregular practices. Therefore, the data distribution can be performed with a high efficiency and a high security.

BRIEF DESCRIPTION OF THE DRAWINGS

FIG. 11 is a diagram showing the basic scheme of reduction in key distribution data amount in the embodiments of the present invention.

DESCRIPTION OF THE PREFERRED EMBODIMENTS

FIG. 11 is a diagram showing the basic scheme of reduction in key distribution data amount in the present invention.

According to FIG. 11, a key generator extracts $\underline{k}$ information from $\underline{m}$ confidential information $a_1, a_2, \ldots, a_m$ and generates confidential key information of a receiver from the extracted information. At this time, it is possible to obtain combinations the number of which is efficiently large as compared with the value of $\underline{m}$. For example, when $(m, k)=(30, 15)$, the keys of one hundred and fifty million of receivers can be generated.

The key generator opens public information $b_1, b_2, \ldots, b_m$ corresponding to the confidential information $a_1, a_2, \ldots, a_m$ to the public. A sender selects random numbers $\underline{r}$ and transmits information $c_1, c_2, \ldots, c_m$ obtained by applying the random numbers to the public information $b_1, b_2, \ldots, b_m$.

A receiver selects the same combination as that at the time of generation of the confidential information of the receiver from the information $c_1, c_2, \ldots, c_m$ to perform the calculation of a common key by use of the confidential information of the receiver.

Thereby, the mere transmission of $\underline{m}$ data makes it possible to possess the key in common with receivers the number of which is not larger than $m!/(m-k)!k!$.

[Description of Symbols]

Prior to the description of embodiments of the present invention, explanation will be made of some symbols used in the description.

Z represents a set of the whole of integers, and lcm(a,b) represents the lowest common multiple of integers $\underline{a}$ and $\underline{b}$. Also, $\text{ord}_p(g)=m$ for a prime number $\underline{p}$ and a positive integer $g$ means that the least integer $x>0$ satisfying $g^x \equiv 1 \pmod{p}$ is $\underline{m}$, and min $\{a_1, a_2, \ldots, a_n\}$ represents the least value in $a_1, a_2, \ldots, a_n$ ($a_i \in Z$).

(First Embodiment)

In a first embodiment, description will be made of a method in which a sender and a plurality of receivers share a common key information in order to perform a secure broadcast communication.

Figure 1:
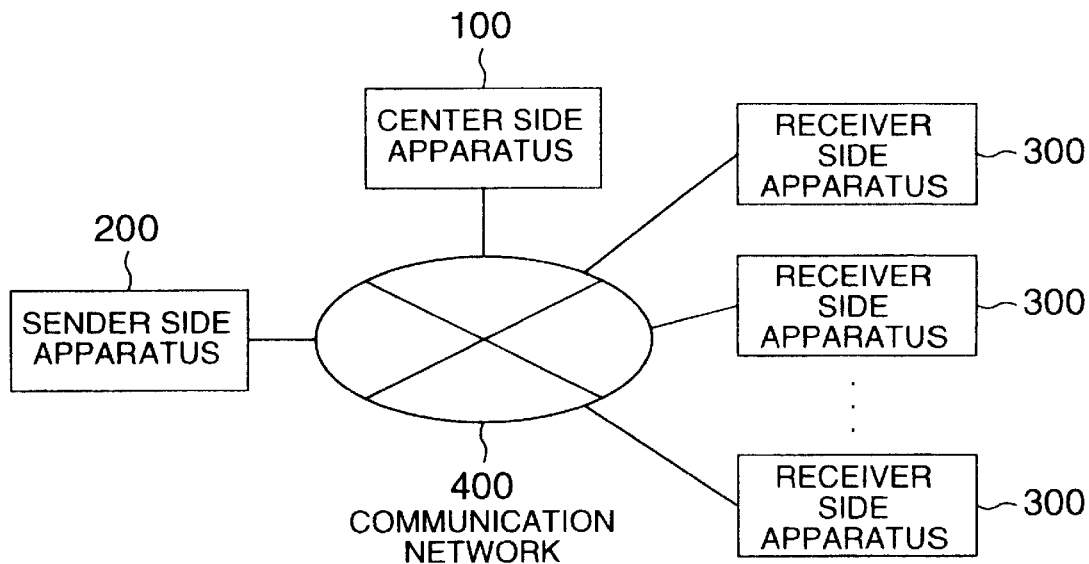
FIG. 1 is a diagram showing the construction of a system in first and second embodiments of the present invention.

FIG. 1 is a diagram showing the construction of a system in the present embodiment. This system includes a center side apparatus 100, a sender side apparatus 200 and receiver side apparatuses 300.

Figure 2:
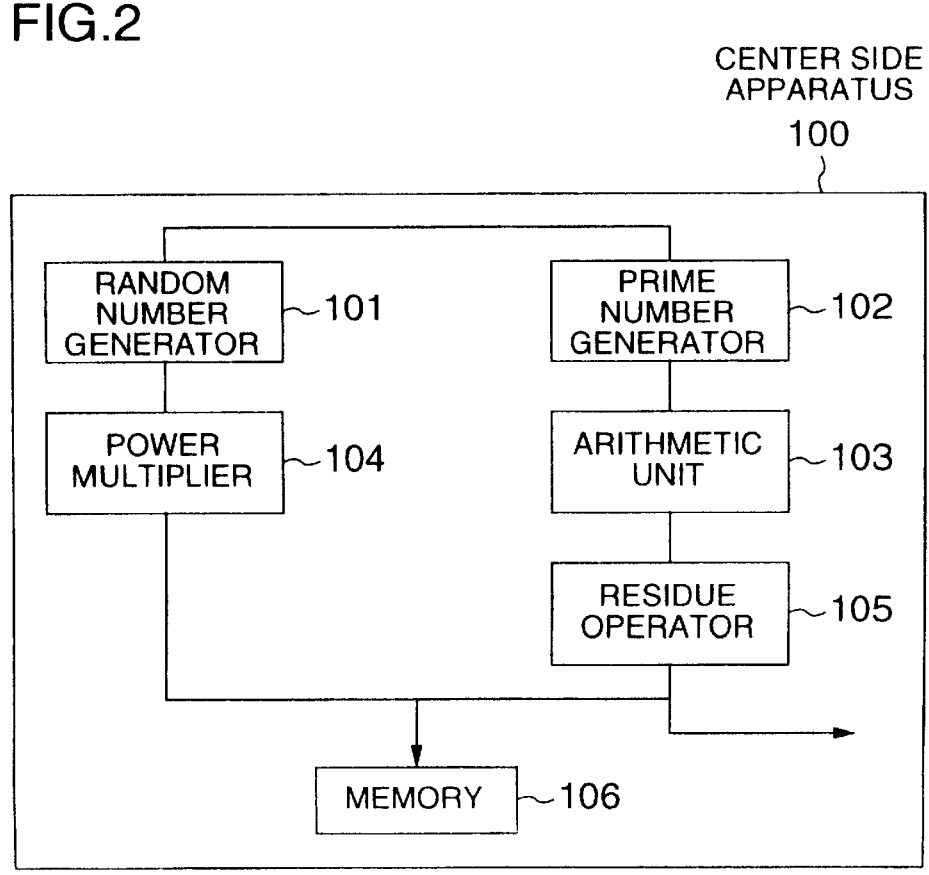
FIG. 2 is a diagram showing the internal construction of a center side apparatus in the first and second embodiments of the present invention.

FIG. 2 shows the internal construction of the center side apparatus 100. The center side apparatus 100 is provided with a random number generator 101, a prime number generator 102, an arithmetic unit 103, a power multiplier 104, a residue operator 105 and a memory 106.

Figure 3:
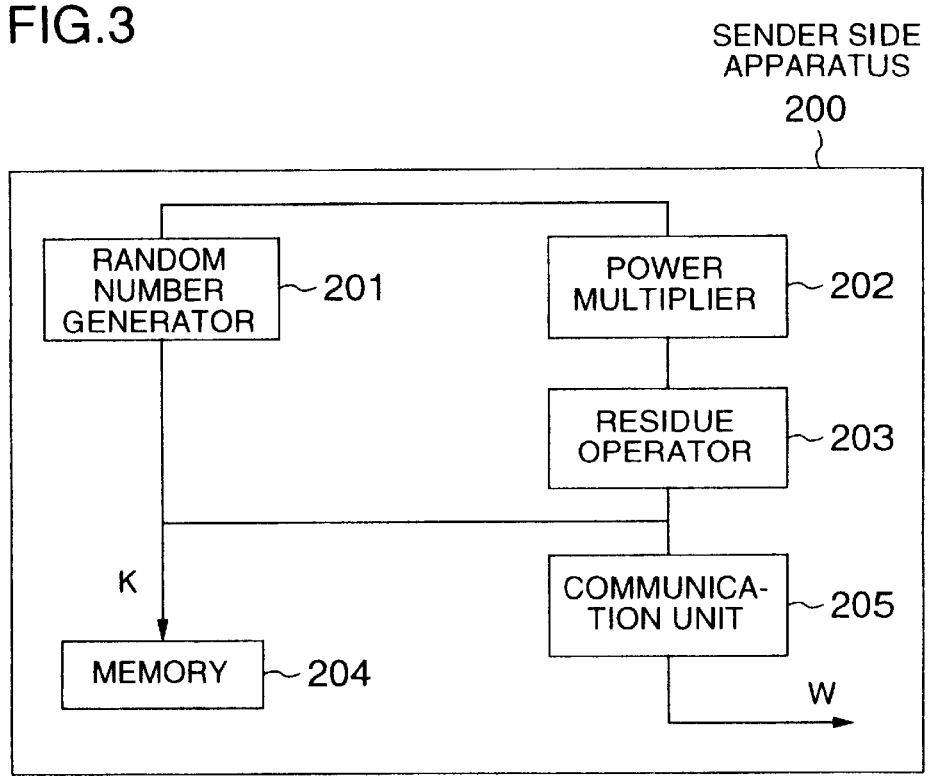
FIG. 3 is a diagram showing the internal construction of a sender side apparatus in the first and second embodiments of the present invention.

FIG. 3 shows the internal construction of the sender side apparatus 200. The sender side apparatus 200 is provided with a random number generator 201, a power multiplier 202, a residue operator 203, a memory 204 and a communication unit 205.

Figure 4:
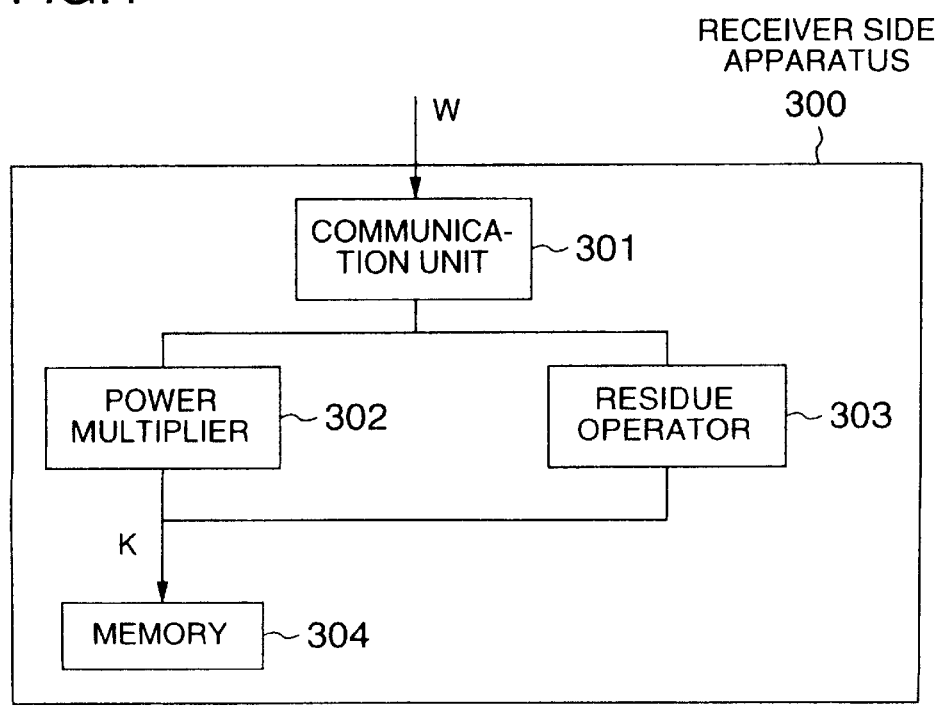
FIG. 4 is a diagram showing the internal construction of a receiver side apparatus in the first and second embodiments of the present invention.

FIG. 4 shows the internal construction of the receiver side apparatus 300. The receiver side apparatus 300 is provided with a communication unit 301, a power multiplier 302, a residue operator 303 and a memory 304.

1. Preparatory Process

A reliable center generates the following information by use of the random number generator 101, the prime number generator 102, the arithmetic unit 103, the power multiplier 104 and the residue operator 105 in the center side apparatus 100 shown in FIG. 2.

Confidential information:

$P_i, Q_i$: prime number ($1 \leq i \leq m$)

$L_i = \text{lcm}(\text{ord}_{P_i}(g)\, \text{ord}_{Q_i}(g))$ ($1 \leq i \leq m$)

$e_i \in Z$, $0 < e_i < L = \text{lcm}(L_1, L_2, \ldots, L_m)$ ($1 \leq i \leq n$)

Public information:

$N_i = P_i Q_i$ ($1 \leq i \leq m$)

$g \in Z$, $0 < g < N$ $$\bullet N = \prod_{i=1}^{m} N_i$$

$V_i = g^{h_i(e_1, \ldots, e_n)} \mod N$ ($1 \leq i \leq M$).

The center opens only the public information to the public. The confidential information is stored into the memory 106.

Further, the center calculates $S_{x,\tau} = (S_{x,\tau(1)}, S_{x,\tau(2)}, \ldots, S_{x,\tau(d)})$ satisfying $$\sum_{i=1}^{d} S_{x,\tau(i)} h_{\tau(i)}(e_1, \ldots, e_n) \equiv 1 \pmod{L_{\sigma_x}}$$

for $\sigma_x \in S$ and $\tau \in T$ by use of the arithmetic unit 103 and the residue operator 105 in the center side apparatus 100 and distributes $S_{x,\tau}$ as key information of a receiver $\underline{x}$. Therein, $$L_\sigma = \text{lcm}(L_{\sigma(1)}, L_{\sigma(2)}, \ldots, L_{\sigma(k)}).$$

Also, $h_i(X_1, \ldots X_n)$ ($1 \leq i \leq M$) represents a monomial of $X_1, \ldots, X_n$ on Z. For set $S' = \{f | \text{one-to-one map } f: A = \{1, 2, \ldots, k\} \to B = \{1, 2, \ldots, m\}, m > k\}$, $\sigma_1, \sigma_2 \in S'$, a relation "~" on S' is defined as $$\sigma_1 \sim \sigma_2 \overset{\text{def}}{\Longleftrightarrow} \sigma_1(A) = \sigma_2(A),$$

and a quotient set of S' concerning "~" is defined as S. Further, set $T = \{f | \text{one-to-one map } f: A = \{1, 2, \ldots, d\} \to B = \{1, 2, \ldots, M\}, M \geq d\}$.

Here, $S_{x,\tau}$ is generated so as to satisfy the condition of a secure key that $\pi_x \neq g$ for $$r_x = g \sum_{i=1}^{d} s_{x,\tau(i)} h_{\tau(i)}(e_1, \ldots, e_n) \mod N.$$

2. Key Distribution Process (1) A sender randomly selects an integer r by use of the random number generator 201 in the sender side apparatus 200 shown in FIG. 3 to calculate a common key K by use of the power multiplier 202 and the residue operator 203 so that $$0 < K = g^r \mod N,$$

$$\pi_x^r \mod N < \min\left\{ N_\sigma = \prod_{i=1}^{k} N_{\sigma(i)} \,\middle|\, \sigma \in S \right\}$$

is satisfied. K is stored into the memory 204. Further, the sender calculates $$z_i = v_i^r \mod N \ (1 \leq i \leq M)$$

with the object of possessing the key K in common with the receiver and makes the multi-address transmission of data W obtained by multiplexing $z_i$ ($1 \leq i \leq M$) by use of the communication unit 205 (in accordance with, for example, the multiplexing method using the Chinese reminder theorem mentioned in "BACKGROUND OF THE INVENTION"). The transmission is made through a communication network 400.

(2) The receiver side apparatus 300 (see FIG. 4) of the receiver x demultiplexes $Z_{\tau(i)}$ ($1 \leq i \leq d$) from the transmit data W by use of the communication unit 301 and uses the power multiplier 302 and the residue operator 303 to calculate the common key K from $S_{x,\tau}$ and N in the memory 304 in accordance with $$K = \prod_{i=1}^{d} z_{\tau(i)} s_{x,\tau(i)} \mod N.$$

The calculated common key K is stored into the memory 304.

According to the present embodiment, a space for generating the key information of a receiver is changed for each receiver. (The space is determined by the value of $L_{\sigma x'}$.) Therefore, the security against the conspiracy attack of receivers is improved as compared with that in the system disclosed by Mambo et al., "Efficient Secure Broadcast Communication Systems", IEICE Technical Report, ISEC93-34 (October 1993) mentioned in "BACKGROUND OF THE INVENTION".

(Second Embodiment)

In a second embodiment, description will be made of a method in which a sender and a plurality of receivers share a common key information in order to perform a secure broadcast communication.

The construction of a system is the same as that shown in FIG. 1 in conjunction with the first embodiment.

1. Preparatory Process

A reliable center generates the following information by use of the random number generator 101, the prime number generator 102, the arithmetic unit 103, the power multiplier 104 and the residue operator 105 in the center side apparatus 100 shown in FIG. 2.

Confidential information:

$P_i$, $Q_i$: prime number ($1 \leq i \leq m$)

$e_i \in Z$, $0 < e_i < L = \text{lcm}(L_1, L_2, \ldots, L_m)$ ($1 \leq i \leq n$)

Public information:

- $N_i = P_i Q_i$ ($1 \leq i \leq m$)

- $g_i \in Z$, $0 < g_i < M$ ($1 \leq i \leq M$)

- $N = \prod_{i=1}^{m} N_i$

- $V = (v_{i,j})$, $v_{i,j} = g_i h_j(e_1, \ldots, e_n) \mod N$ ($1 \leq i, j \leq M$).

The center opens only the public information to the public. The confidential information is stored into the memory 106.

Further, the center calculates $s_{\sigma_x} = ((S_{\sigma_{x,1}(1)}, S_{\sigma_{x,1}(2)}, \ldots, S_{\sigma_{x,1}(k)}), \ldots (S_{\sigma_{x,a}(1)}, S_{\sigma_{x,a}(2)}, \ldots, S_{\sigma_{x,a}(k)}))$ satisfying $$\sum_{i=1}^{k} s_{\sigma_{x,j}(i)} h_{\sigma_{x,j}(i)}(e_1, \ldots, e_n) \equiv 1 (\mod L_{\sigma'_{x,j}}),$$

($1 \leq j \leq a$)

($1 \leq j \leq a$)

for $\sigma_x = (\sigma_{x,1}, \ldots, \sigma_{x,a}) \in S$, $\sigma'_x = (\sigma'_{x,1}, \ldots, \sigma'_{x,a}) \in T$ by use of the arithmetic unit 103 and the residue operator 105 in the center side apparatus 100 and distributes $S_{\sigma_x}$ and $$N_{\sigma'_{x,i}} = \prod_{j=1}^{d} N_{\sigma_{x,i}(j)}, \quad (i = 1, \ldots, a)$$

as key information of a receiver x. Therein, $$L_{\sigma'_{x,i}} = \text{ord}_{N_{\sigma'_{x,i}}} \left( \prod_{j=1}^{k} g_{\sigma_{x,i}(j)} \right),$$

($i = 1, \ldots, a$, $a$ : positive integer).

Also, $h_i(X_1, \ldots, X_n)$ ($1 \leq i \leq m$) represents a monomial of $X_1, \ldots, X_n$ on Z. For set $S'(M) = \{\sigma = (\sigma_1, \ldots, \sigma_a) |$ one-to-one map $\sigma_i: A = \{1, 2, \ldots, k\} \to B = \{1, 2, \ldots, M\}$ ($i = 1, \ldots, a$), $\sigma_1(A) \cup \ldots \cup \sigma_a(A) = B$, $M = ak\}$, $\sigma = (\sigma_1, \ldots, \sigma_a)$, $\sigma' = (\sigma'_1, \ldots, \sigma'_a) \in S'(M)$, a relation $$\sigma \sim \sigma' \overset{def}{\Leftrightarrow} \{\sigma_1(A), \ldots, \sigma_a(A)\} = \{\sigma'_1(A), \ldots, \sigma'_a(A)\}$$

is defined and a quotient set of $S'(M)$ concerning "~" is defined as S. Further, a quotient set of m=ad, S'(m) concerning "~" is defined as T.

2. Key Distribution Process (1) A sender randomly selects an integer r by use of the random number generator 201 in the sender side apparatus 200 shown in FIG. 3 to calculate a common key K $$K = \left( \prod_{i=1}^{M} g_i \right)^r \mod N,$$

-continued $$0 < \left(\prod_{j=1}^{k} g_{\sigma'_{x,i}(j)}\right)^r \mod N \leq \min\{N_{\sigma'_{x,i}} \mid \forall x, \sigma'_x\}$$

$$i = (1, \ldots, a)$$

by use of the power multiplier 202 and the residue operator 203 and stores K into the memory 204. Further, the sender calculates $$W = (w_{ij}), \; w_{ij} = v_{ij}^r \mod N (1 \leq i, j \leq M)$$

with the object of possessing the key K in common with the receiver and makes the multi-address transmission of the data W through the communication network 400 by use of the communication unit 205.

(2) The receiver side apparatus 300 (see FIG. 4) of the receiver x, from the transmit data W received by the communication device 301 and by use of the power multiplier 302 and the residue operator 303, calculates the common key K from $s_{\sigma_x}$ and N in the memory 304 in accordance with $$K = \prod_{i=1}^{a} k_i \mod N$$

wherein $$K_t = \prod_{i=1}^{k} \left(\prod_{j=1}^{k} w_{\sigma_{x,t}(j)\sigma_{x,t}(i)}\right)^{s_{\sigma_{x,t}}(i)} \mod N_{\sigma'_{x,t}}$$

$$(1 \leq t \leq a).$$

The calculated common key K is stored into the memory 304.

In the second embodiment, one condition for generation of a secure key may be $$\sum_{i=1}^{k} s_{\sigma_{x,j}(i)} h_{\sigma_{x,j}(i)}(e_1, \ldots, e_n) \equiv 1 (\mod \tilde{L}_{\sigma'_{x,j}})$$

$$\tilde{L}_{\sigma'_{x,j}} = lcm\left(\text{ord}_{N_{\sigma'_{x,j}}}\left(g_{\sigma_{x,j}(1)}\right), \ldots, \text{ord}_{N_{\sigma'_{x,j}}}\left(g_{\sigma_{x,j}(k)}\right)\right)$$

$$(j = 1, \ldots, a)$$

According to the second embodiment, a space for generating the key information of a receiver is changed for each receiver. (This space is determined by the value of $L_{\sigma'_{x,1}}, \ldots, L_{\sigma'_{x,a}}$) Therefore, the security against the conspiracy attack of receivers is improved as compared with that in the system disclosed by Mambo et al., "Efficient Secure Broadcast Communication Systems", IEICE Technical Report, ISEC93-34 (October 1993) mentioned in "BACKGROUND OF THE INVENTION".

(Third Embodiment)

The present embodiment corresponds to the case where a limited secure broadcast communication method based on the key distribution method according to the first embodiment is applied to an information distribution service system using a satellite. Namely, a broadcast station makes the secure broadcast communication of information (including onerous data) such as multimedia information to receivers by use of a satellite and only receivers entitled to looking and listening (or receivers under agreement for the payment of counter values) can decipher transmit data.

Figure 5:
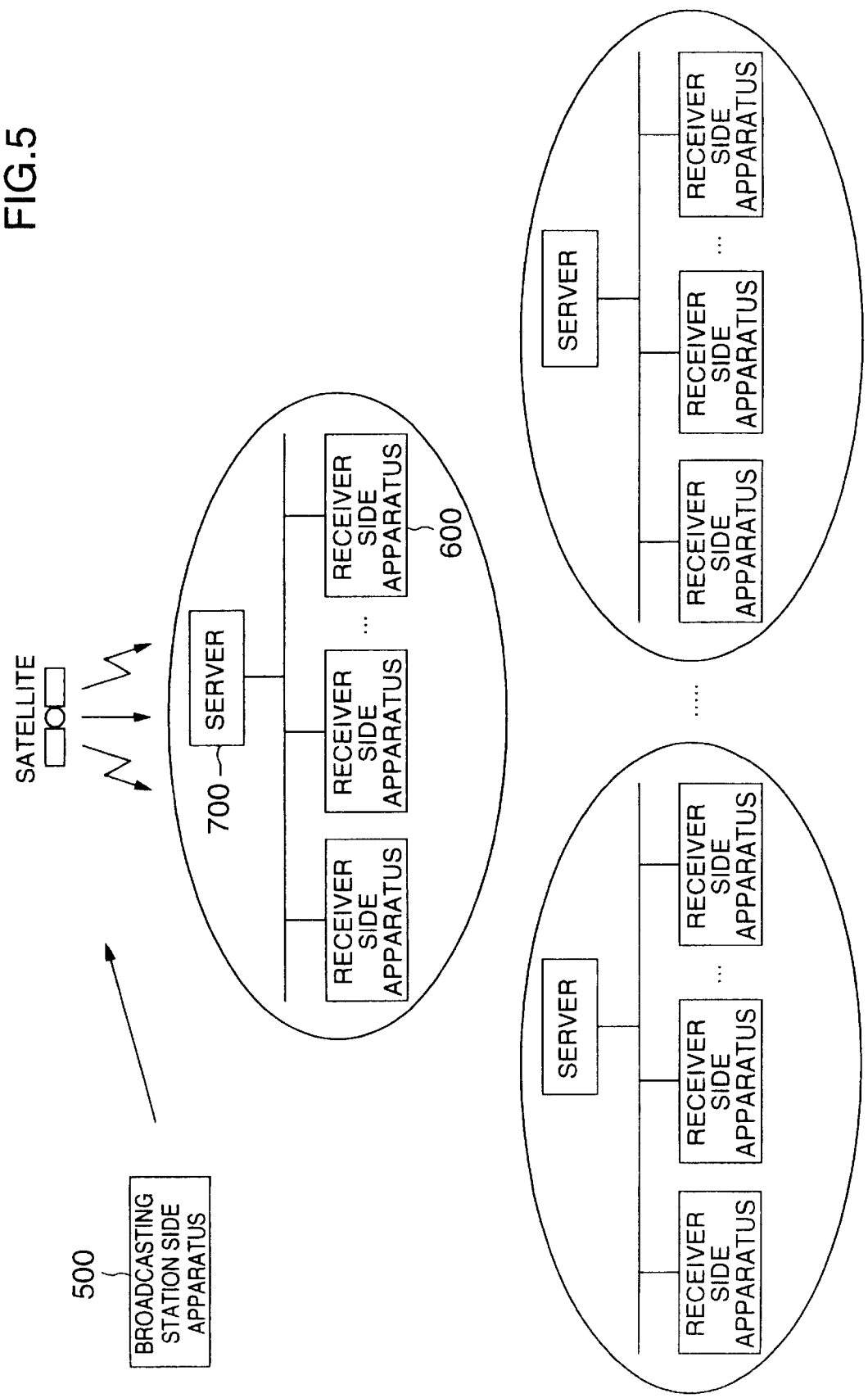
FIG. 5 is a diagram showing the construction of a system in third, fourth and eighth embodiments of the present invention.

FIG. 5 is a diagram showing the construction of a system in the present embodiment. This system includes a broadcasting station side apparatus 500, receiver side apparatuses 600 and servers 700.

Figure 6:
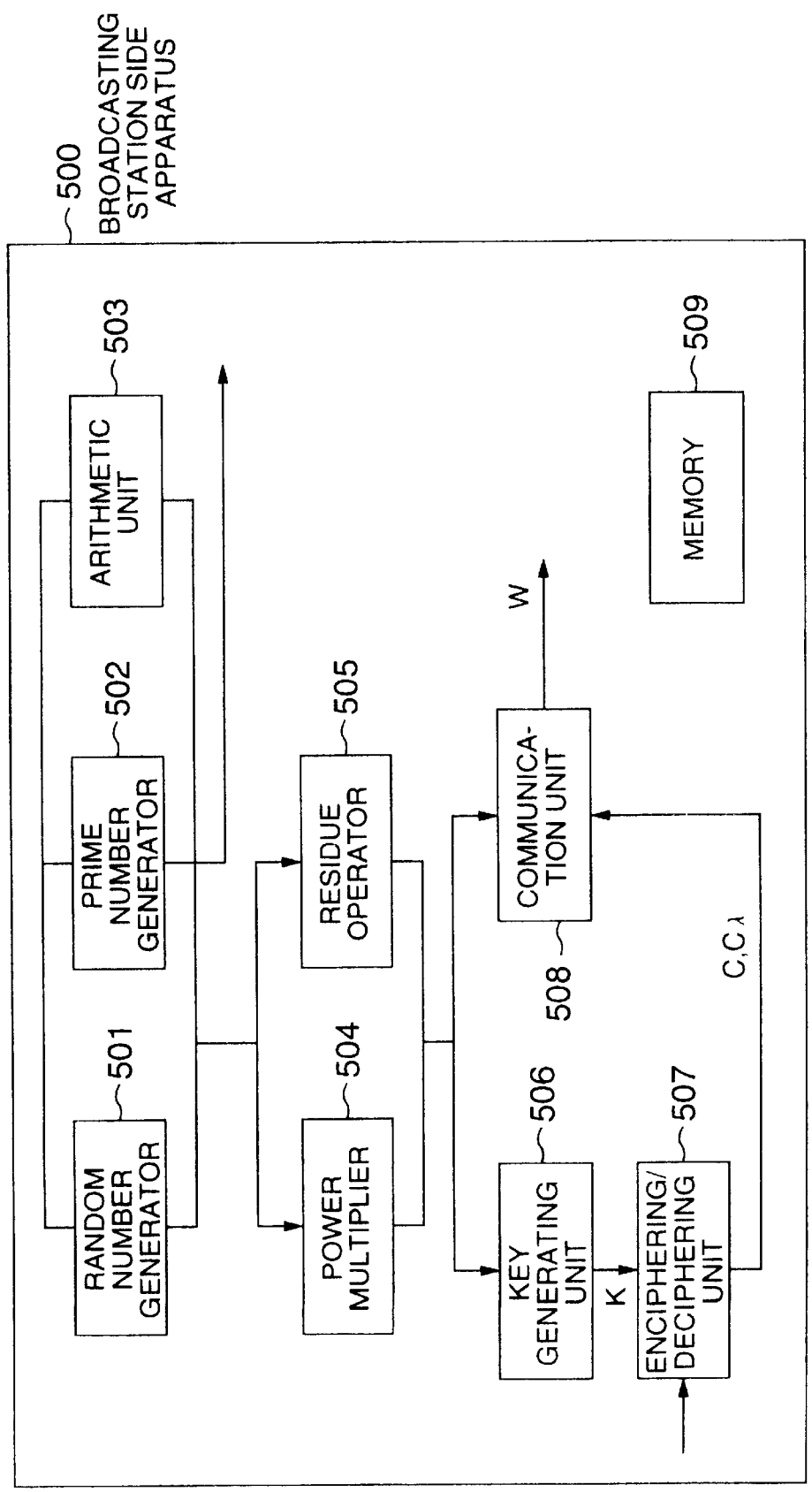
FIG. 6 is a diagram showing the internal construction of a sender side apparatus in the third, fourth and eighth embodiments of the present invention.

FIG. 6 shows the internal construction of the broadcasting station side apparatus 500. The broadcasting station side apparatus 500 is provided with a random number generator 501, a prime number generator 502, an arithmetic unit 503, a power multiplier 504, a residue operator 505, a key generating unit 506, an enciphering/deciphering unit 507, a communication unit 508 and a memory 509.

Figure 7:
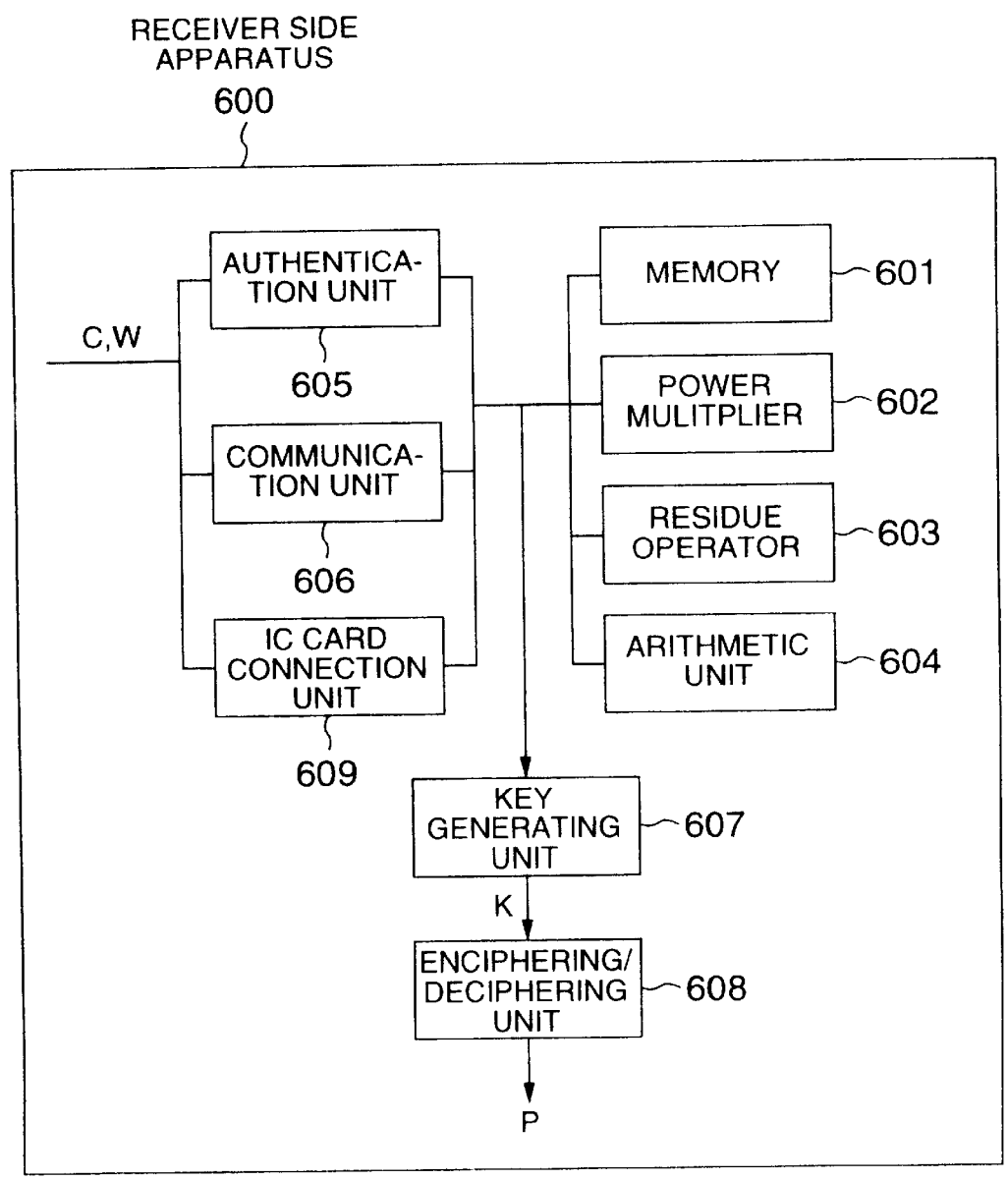
FIG. 7 is a diagram showing the internal construction of a receiver side apparatus in the third, fourth and eighth embodiments of the present invention.

FIG. 7 shows the internal construction of the receiver side apparatus 600. The receiver side apparatus 600 is provided with a memory 601, a power multiplier 602, a residue operator 603, an arithmetic unit 604, an authentication unit 605, a communication unit 606, a key generating unit 607, an enciphering/deciphering unit 608 and an IC card connection unit 609.

Figure 8:
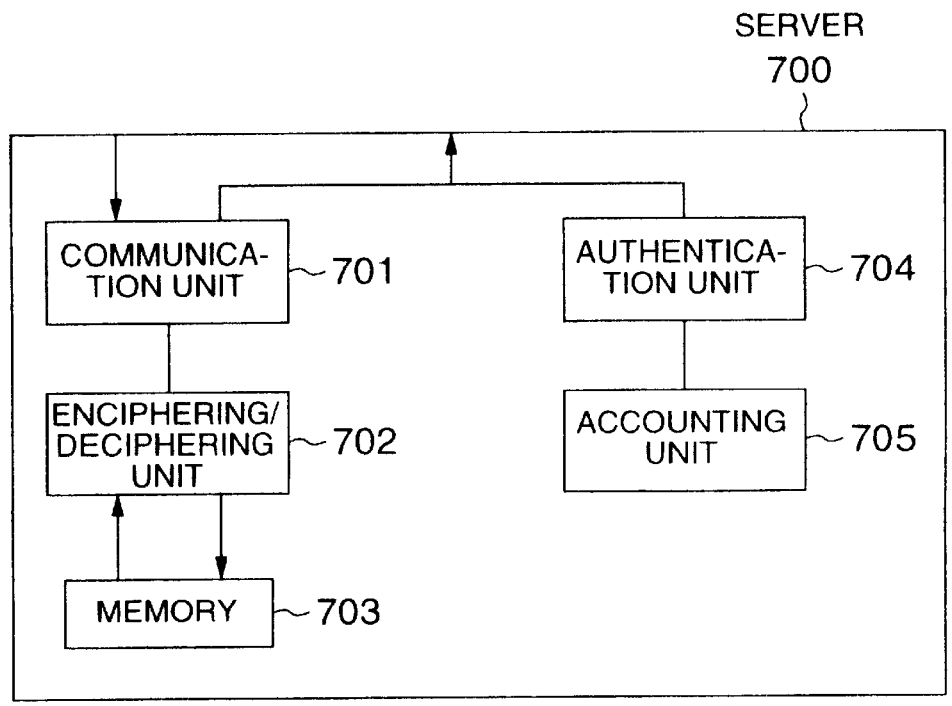
FIG. 8 is a diagram showing the internal construction of a server in the third, fourth and eighth embodiments of the present invention.

FIG. 8 shows the internal construction of the server 700. The server 700 is provided with a communication unit 701, an enciphering/deciphering unit 702, a memory 703, an authentication unit 704 and an accounting unit 705.

Figure 9:
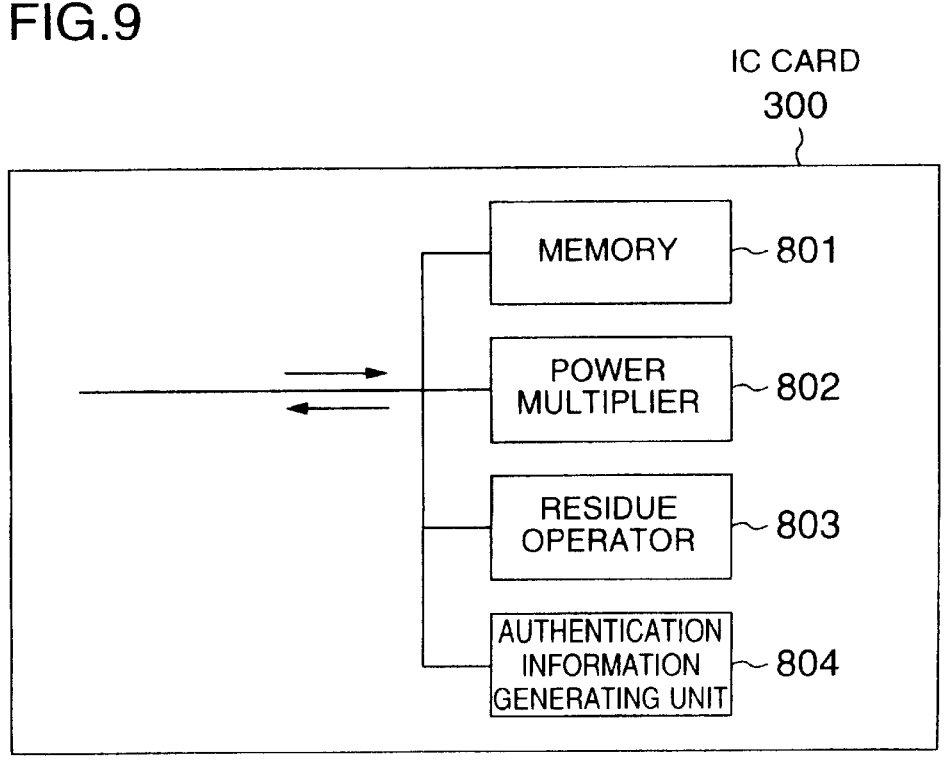
FIG. 9 is a diagram showing the internal construction of an IC card in sixth and seventh embodiments of the present invention.

FIG. 9 shows the internal construction of an IC card 800 possessed by a receiver. The IC card 800 is provided with a memory 801, a power multiplier 802, a residue operator 803 and an authentication information generating unit 804.

Figure 10:
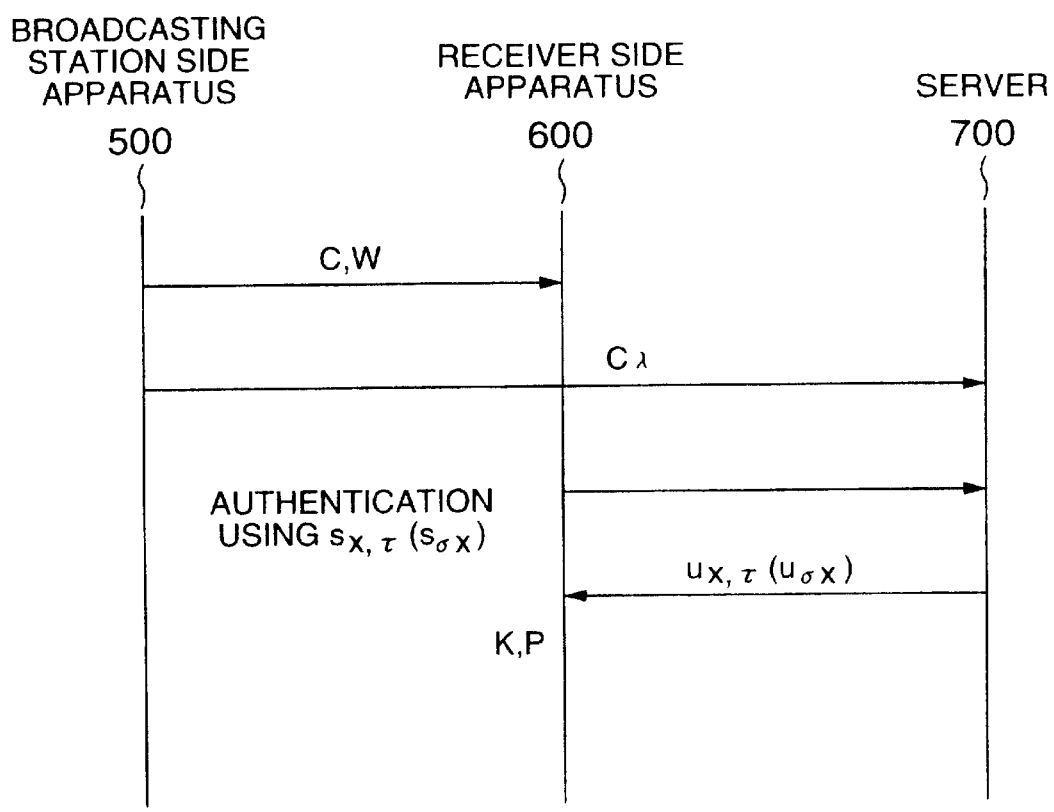
FIG. 10 is a diagram showing the outline of the third and fourth embodiments of the present invention.

FIG. 10 is a diagram showing the outline of transfer of information between the broadcasting station side apparatus 500, the receiver side apparatus 600 and the server 700.

A set R of receivers is $R = \cup_{\lambda \in \Lambda} R_\lambda$ for a family $\{R_\lambda\}_{\lambda \in \Lambda}$ of subsets and a server $S_\lambda$ is provided corresponding to each subset $R_\lambda$.

1. Preparatory Process

A broadcasting station generates the following information by use of the random number generator 501, the prime number generator 502, the arithmetic unit 503, the power multiplier 504 and the residue operator 505 in the broadcasting station side apparatus 500 and stores in the memory 509 (see FIG. 6).

Confidential information:

$P_i, Q_i$:prime number $(1 \leq i \leq m)$ $L_i = lcm \; (\text{ord}_{p_i}(g), \text{ord}_{Q_i}(g)) \; (1 \leq i \leq m)$ $e_i \in Z, 0 < e_i < L = lcm \; (L_1, L_2, \ldots, L_m) \; (1 \leq i \leq n)$ Public information:

- $N_i = P_i Q_i (1 \leq i \leq m)$
- $g \in Z, 0 < g < N$
- $N = \prod_{i=1}^{m} N_i$
- $v_i = g^{h_i(e_1, \ldots, e_n)} \mod N \; (1 \leq i \leq M).$ The broadcasting station opens only the public information to the public.

Further, the broadcasting station generates $S_{x,\tau} = S_{x,\tau(1)}, S_{x,\tau(2)}, \ldots, S_{x,\tau(d)} \; (S_{x,\tau(i)} \in Z, 0 < S_{x,\tau(i)} < L, \tau \in T)$ by use of the random number generator 501 and distributes $s_{x,\tau}$ as key information of a receiver x. Therein, $h_i \; (X_1, \ldots, X_n) \; (1 \leq i \leq M)$ represents a monomial of $X_1, \ldots, X_n$ on Z. Also, set T={f|one-to-one map f:A={1, 2, ..., d}→B={1, 2, ..., M}, M≧d}.

The broadcasting station generates a random number r' $(0 \leq r' \leq L)$ for $\sigma_x \in S$ by use of the random number generator 501 in the broadcasting station side apparatus 500 and calculates $U_{x,\tau} = (U_{x,\tau(1)}, U_{x,\tau(2)}, \ldots, U_{x,\tau(d)})$ satisfying $$\sum_{i=1}^{d} u_{x,\tau(i)} s_{x,\tau(i)} h_{\tau(i)}(e_1, \ldots, e_n) \equiv r' \pmod{L_{\sigma_x}}$$

by use of the arithmetic unit 503 and the residue operator 505, wherein $$L_\sigma = l \text{ cm}(L_{\sigma(1)}, L_{\sigma(2)}, \ldots, L_{\sigma(k)})(\sigma \in S).$$

Also, for set S'={f|one-to-one map f:A={1, 2, ..., k}→B={1, 2, ..., m}, m≧K}, $\sigma_1$, $\sigma_2 \in$ S', a relation "~" on S' is defined as $$\sigma_1 \sim \sigma_2 \overset{def}{\Longleftrightarrow} \sigma_1(A) = \sigma_2(A),$$

and a quotient set of S' concerning "~" is defined as S.

Here, $s_{x,\tau}$ is generated so as to satisfy the condition of a secure key that $\pi_x \neq g$ for $$p_x = g \sum_{i=1}^{d} s_{x,\tau(i)} h_{\tau(i)}(e_1, \ldots, e_n) \bmod N.$$

2. Enciphering/Deciphering Process (1) The broadcasting station randomly selects an integer r (0≦r≦L) by use of the random number generator 501 in the broadcasting station side apparatus 500 so that $$0 < g^{rr'} \bmod N,$$

$$\pi_x^{rr'} \bmod N < \min\left\{ N_\sigma = \prod_{i=1}^{k} N_{\sigma(i)} \,\middle|\, \sigma \in s \right\}$$

is satisfied, and generates a data enciphered key K=f($g^{rr'}$ mod N) by use of the power multiplier 504, the residue operator 505 and the key generating unit 506. Further, the broadcasting station calculates $$z_i = v_i^r \bmod N (1 \leq i \leq M)$$

and makes the multi-address transmission of an enciphered sentence C=E(K:P) obtained by enciphering data P by the key K by use of the enciphering/deciphering unit 507 and data W obtained by multiplexing $z_i$ (1≦i≦M) by use of the communication unit 508 (in accordance with, for example, the multiplexing method using the Chinese reminder theorem mentioned in "BACKGROUND OF THE INVENTION"). Herein, f is a key generation function of a confidential key enciphering system opened to the public. Further, the broadcasting station generates $$V_\lambda = \{u_{x,\tau} = (u_{x,\tau(1)}, \ldots, u_{x,\tau(d)}) | x \in R_\lambda\}$$

for each $\lambda \in \Lambda$ by use of the arithmetic unit 503 and the residue operator 505 in the broadcasting station side apparatus 500, obtains an enciphered sentence $C_\lambda = E(K(S_\lambda):V_\lambda)$ by enciphering $V_\lambda$ by a key $K(S_\lambda)$ by use of the enciphering/deciphering unit 507 and transmits $C_\lambda$ to the server 700 ($S_\lambda$) by use of the communication unit 508. The key $K(S_\lambda)$ is shared between the broadcasting station and the server 700 ($S_\lambda$) beforehand.

(2) In order to see the data P, a receiver x uses the communication unit 606 in the receiver side apparatus 600 shown in FIG. 7 to make access to a server 700 in an area to which the receiver belongs. And, the receiver uses the authentication unit 605 in the receiver side apparatus 600 (and the server 700 uses the authentication unit 704) to make the authentication by demonstrating the possession of the confidential information $s_{x,\tau}$. If the authentication is materialized, the server 700 transmits $U_{x,\tau} = (U_{x,\tau(1)}, U_{x,\tau(2)}, \ldots, U_{x,\tau(k)})$ in the memory 703 to the receiver side apparatus 600 of the receiver x by use of the communication unit 701.

At this time, in the case where the data P is onerous, the server 700 performs a process for account to the receiver x by use of the accounting unit 705.

(3) The receiver side apparatus 600 of the receiver x calculates a data enciphered key K from $S_{x,\tau}$ in the memory 601 by use of the power multiplier 602, the residue operator 603 and the key generating unit 607 in accordance with $$K = \prod_{i=1}^{d} z_{\tau(i)} u_{x,\tau(i)} s_{x,\tau(i)} \bmod N$$

and deciphers the data P from the enciphered sentence by use of the enciphering/deciphering unit 608.

Also, a method for authentication by the receiver x for the server 700 in the step (2) of the above-mentioned enciphering/deciphering process can rely upon a known authentication system, so far as it is a method with which the authentication is not materialized if the receiver x does not know $s_{x,\tau}$.

In the following, a method using a signature as disclosed by RSA (R. L. Rivest, A. Shamir and L. Adleman, "A method for obtaining digital signatures and public key cryptosystems", Commun. of the ACM, Vol. 21, No. 2, pp. 120–126 (1987)) will be mentioned as an example of the method for authentication by the receiver x for the server 700.

The broadcasting station distributes ($y_x$, $n_x$) satisfying $$S'_x y_x \equiv 1 (\bmod \, l \text{ cm}(p_x-1, q_x-1)), \, n_x = p_x q_x (p_x, q_x : \text{prime number})$$

for each receiver x to a server 700 in an area to which the receiver belongs, wherein $s'_x = \pi(s_{x,\tau})$ for a function $\pi$ opened to the public.

(i) The receiver x uses the authentication unit 605 in the receiver side apparatus 600 to generate a signature $$sgn_x(h(W) = h(W)^{s'_x} \bmod n_x$$

for h(W) (0<h(W)<$n_x$) by use of a confidential key $s'_x$, wherein W is the multi-address transmitted data and h is a one-way hash function which is public information. The generated signature is transmitted to the server 700 by use of the communication unit 606. The signature is transmitted together with a data name for which the looking and listening are desired.

(ii) The server 700 checks a relation of $$sgn_x(h(W))^{y_x} \equiv h(W) (\bmod n_x)$$

by use of the authentication unit 704 and transmits $u_{x,\tau}$ in the memory 703 to the receiver side apparatus 600 of the receiver x by use of the communication unit 701 if the relation is satisfied. At this time, in the case where the data desired by the receiver for the looking and listening is onerous, the server 700 performs a process for account to the receiver x by use of the accounting unit 705. Also, in the case where the receiver x possesses an IC card 800 having confidential information $s'_x$ and connects the IC card 800 to the IC card connection unit 609 in the receiver side apparatus 600 to obtain data from the broadcasting station, the calculation by the receiver using the confidential information $s'_x$ is performed using the authentication information generating unit 804 in the IC card 800 shown in FIG. 9. For instance, in the above example, the calculation of $sgn_x(W)$ is performed using the authentication information generating unit 804 in the IC card 800.

According to the present embodiment, the identification of a set of receivers sharing a key is made by distributing $u_{x,\tau}$ to only limited receivers. Thereby, the key distribution for a limited secure broadcast communication becomes possible.

(Fourth Embodiment)

The present embodiment corresponds to the case where a limited secure broadcast communication method based on the key distribution method according to the second embodiment is applied to an information distribution service system using a satellite. Namely, a broadcast station makes the secure broadcast communication of information (including onerous data) such as multimedia information to receivers by use of a satellite and only receivers entitled to looking and listening (or receivers under agreement for the payment of counter values) can decipher transmit data.

The construction of a system in the present embodiment is the same as that shown in FIG. 5 explained in conjunction with the third embodiment. FIGS. 6 to 10 are also applied to the present embodiment.

A set R of receivers is $R = U_{\lambda \in \Lambda} R_\lambda$ for a family $\{R_\lambda\}_{\lambda \in \Lambda}$ of subsets and a server $S_\lambda$ is provided corresponding to each subset $R_\lambda$.

1. Preparatory Process

A broadcasting station generates the following information by use of the random number generator 501, the prime number generator 502, the arithmetic unit 503, the power multiplier 504 and the residue operator 505 in the broadcasting station side apparatus 500 (see FIG. 6).

Confidential information:

$P_i$, $Q_i$: prime number ($1 \leq i \leq m$)

$e_i \in Z$, $0 < e_i < L = \text{lcm}(L_1, L_2, \ldots, L_m)$ ($1 \leq i \leq n$)

Public information:

- $N_i = P_i Q_i$ ($1 \leq i \leq m$)

- $N = \prod_{i=1}^{m} N_i$

- $V = (v_{ij})$, $v_{ij} = g_i h_j(e_1, \ldots, e_n) \bmod N$ ($1 \leq i, j \leq M$).

The broadcasting station opens only the public information to the public.

Further, the broadcasting station generates $S_{\sigma_x} = ((S_{\sigma_{x,1}(1)}, S_{\sigma_{x,1}(2)}, \ldots, S_{\sigma_{x,1}(k)}), \ldots, (S_{\sigma_{x,a}(1)}, S_{\sigma_{x,a}(2)}, \ldots, S_{\sigma_{x,a}(k)}))$ $S_{\sigma_{x,1}(i)}, \ldots, S_{\sigma_{x,a}(i)} \in Z$, $0 < S_{x,\tau(i)} < L$, $\sigma_x = (\sigma_{x,1}, \ldots, \sigma_{x,a}) \in S$) by use of the random number generator 501 and distributes $s_{\sigma x}$ together with $$N_{\sigma'_{x,i}} = \prod_{j=1}^{d} N_{\sigma x, i(j)} : (i = 1, \ldots, a)$$

as key information of a receiver $\underline{x}$. Therein, $h_i(X_1, \ldots, X_n)$ ($1 \leq i \leq M$) represents a monomial of $X_1, \ldots, X_n$ on Z. Also, for set $S'(M) = \{\sigma = (\sigma_1, \ldots, \sigma_a) | \text{one-to-one map } \sigma_i: A = \{1, 2, \ldots, k\} \to B = \{1, 2, \ldots, M\} (i=1, \ldots, a), \sigma_1(A) \cup \ldots \cup \sigma_a(A) = B, M = ak\}$, $\sigma = (\sigma_1, \ldots, \sigma_a)$, $\sigma' = (\sigma'_1, \ldots, \sigma'_a) \in S'(M)$, a relation $$\sigma \sim \sigma' \stackrel{def}{\iff} \{\sigma_1(A), \ldots, \sigma_a(A)\} = \{\sigma'_1(A), \ldots, \sigma'_a(A)\}$$

is defined and a quotient set of $S'(M)$ concerning "~" is defined as S. Further, a quotient set of m=ad, $S'(m)$ concerning "~" is defined as T.

The broadcasting station generates a random number r' ($0 \leq r' \leq L$) for $\sigma_x = (\sigma_{x,1}, \ldots, \sigma_{x,a})) \in S$, $\sigma'_x = (\sigma'_{x,1}, \ldots, \sigma'_{x,a}) \in T$ by use of the random number generator 501 in the broadcasting station side apparatus 500 and calculates $u_{\sigma_x} = ((u_{\sigma_{x,1}(1)}, u_{\sigma_{x,1}(2)}, \ldots, u_{\sigma_{x,1}(1)}), \ldots, (u_{\sigma_{x,a}(1)}, u_{\sigma_{x,a}(2)}, \ldots, u_{\sigma_{x,a}(k)}))$ satisfying $$\sum_{i=1}^{k} u_{\sigma_{x,j}(i)} s_{\sigma_{x,j}(i)} h_{\sigma_{x,j}(i)}(e_1, \ldots, e_n) \equiv r' (\bmod L_{\sigma'_{x,j}})$$

$$(1 \leq j \leq a)$$

by use of the arithmetic unit 503 and the residue operator 505, wherein L satisfies (i=1, ..., a).

$$L_{\sigma'_{x,i}} = \text{ord}_{N_{\sigma'_{x,i}}} \left( \prod_{j=1}^{k} g_{\sigma_{x,i}(j)} \right) (i = 1, \ldots, a).$$

2. Enciphering/Deciphering Process (1) The broadcasting station randomly selects an integer r ($0 \leq r \leq L$) by use of the random number generator 501 in the broadcasting station side apparatus 500 so that $$0 < \left( \prod_{j=1}^{k} g_{\sigma'_{x,i}(j)} \right)^{r'} \bmod N \leq \min \{ N_{\sigma'_{x,i}} \mid \forall x, \sigma'_x \}$$

$$(i = 1, \ldots, a)$$

is satisfied, and generates a data enciphered key $K = f(g_1 g_2 \ldots g_M)^{rr'} \bmod N$) by use of the power multiplier 504, the residue operator 505 and the key generating unit 506. Further, the broadcasting station calculates $$W = (w_{ij}), w_{ij} = v_{ij}^r \bmod N \ (1 \leq i, j \leq M)$$

and makes the multi-address transmission of an enciphered sentence $C = E(K:P)$ obtained by enciphering data P by the key K by use of the enciphering/deciphering unit 507 and the data W. Therein, $\underline{f}$ is a key generation function of a confidential key enciphering system opened to the public. Further, the broadcasting station generates $$V_\lambda = \{ u_{\sigma_x} | x \in R_\lambda \}$$

for each $\lambda \in \Lambda$ by use of the arithmetic unit 503 and the residue operator 505 in the broadcasting station side apparatus 500, obtains an enciphered sentence $C_\lambda = E(K(S_\lambda):V_\lambda)$ by enciphering $V_\lambda$ by a key $K(S_\lambda)$ by use of the enciphering/deciphering unit 507 and transmits $C_\lambda$ to the server 700 ($S_\lambda$) by use of the communication unit 508. The key $K(S_\lambda)$ is shared between the broadcasting station and the server 700 ($S_\lambda$) beforehand.

(2) In order to see the data P, a receiver $\underline{x}$ uses the communication unit 606 in the receiver side apparatus 600 (see FIG. 7) to make access to a server 700 in an area to which the receiver belongs. And, the receiver uses the authentication unit 605 in the receiver side apparatus 600 (and the server 700 uses the authentication unit 704) to make the authentication by demonstrating the possession of the confidential information $s_{o_x}$. If the authentication is materialized, the server 700 transmits $u_{o_x}$ in the memory 703 to the receiver side apparatus 600 of the receiver $\underline{x}$ by use of the communication unit 701.

At this time, in the case where the data P is onerous, the server 700 performs a process for account to the receiver $\underline{x}$ by use of the accounting unit 705.

(3) The receiver side apparatus 600 of the receiver $\underline{x}$ calculates a data enciphered key K from $s_{o_x}$ in the memory 601 by use of the power multiplier 602, the residue operator 603 and the key generating unit 607 in accordance with $$K = \prod_{i=1}^{a} k_i \bmod N$$

and deciphers the data P from the enciphered sentence C by use of the enciphering/deciphering unit 608, wherein $$K_t = \prod_{i=1}^{k} \left( \prod_{j=1}^{k} u_{\sigma_{x,t}(j)\sigma_{x,t}(i)} \right)^{s\sigma_{x,t}(i)} \bmod N_{\sigma'_{x,t}}$$

$(1 \leq t \leq a)$.

Like the third embodiment, a method for authentication by the receiver $\underline{x}$ for the server 700 in (2) of the above-mentioned enciphering/deciphering process can rely upon a known authentication system, so far as it is a method with which the authentication is not materialized if the receiver $\underline{x}$ does not know $s_{o_x}$.

In the fourth embodiment, one condition for generation of a secure key may be $$\sum_{i=1}^{k} u_{\sigma_{x,j}(i)} s_{\sigma_{x,j}(i)} h_{\sigma_{x,j}(i)}(e_1, \ldots, e_n) \not\equiv r' \left( \bmod \tilde{L}_{\sigma'_{x,j}} \right)$$

$$\tilde{L}_{\sigma'_{x,j}} = lcm \left( \mathrm{ord}_{N_{\sigma'_{x,j}}} \left( g_{\sigma_{x,j}(1)} \right), \ldots, \mathrm{ord}_{N_{\sigma'_{x,j}}} \left( g_{\sigma_{x,j}(k)} \right) \right)$$

$(j = 1, \ldots, a)$

According to the present embodiment, the identification of a set of receivers sharing a key is made by distributing $u_{o_x}$ to only limited receivers. Thereby, the key distribution for a limited secure broadcast communication becomes possible.

(Fifth Embodiment)

In a fifth embodiment, the data enciphered key K in the third and fourth embodiments is updated by changing the value of $\underline{r}$ in the data enciphered key $K=f(g^{rr'} \bmod N)$ for each short time period.

Further, the identification of transmit data subjected to multi-address transmission by a broadcasting station is made by taking a value characteristic of transmit data as the value of r'. Namely, information $u_{x,\tau}$ (or $u_{o_x}$) obtained by a receiver $\underline{x}$ from a server 700 in order to looking and listening certain broadcast data is characteristic of that broadcast data information and it is necessary to obtain another information $u'_{x,\tau}$ (or $u'_{o_x}$) from the server 700 in order to look and listen another broadcast data. Thereby, the identification of broadcast data subjected to an accounting process is made.

(Sixth Embodiment)

In the present embodiment, description will be made of a method in which in the case where in the third embodiment the receiver possesses an IC card 800 (see FIG. 9) having key information and connects the IC card 800 to the IC card connection unit 609 in the receiver side apparatus 600 (see FIG. 7) to obtain data from the broadcasting station, the calculation of $$K = \prod_{i=1}^{d} z_{\tau(i)} u_{x,\tau(i)} s_{x,\tau(i)} \bmod N$$

by the receiver $\underline{x}$ in the step (3) of the enciphering/deciphering process in the third embodiment is performed with a high efficiency.

The receiver side apparatus 600 (see FIG. 7) calculates $$\xi_{x,\tau(i)} = z_{\tau(i)}{}^u{}_{x,\tau(i)} \bmod N \ (1 \leq i \leq d)$$

by use of the residue operator 603 and the arithmetic unit 604 and outputs $\xi_{x,\tau(i)}$ $(1 \leq i \leq d)$ to the IC card 800 (see FIG. 9).

The IC card 800 calculates $$\eta_{x,\tau(i)} = \xi_{x,\tau(i)}{}^s{}_{x,\tau(i)} \bmod N \ (1 \leq i \leq d)$$

by use of the power multiplier 802 and the residue operator 803 and outputs $\eta_{x,\tau(i)}$ $(1 \leq i \leq d)$ to the receiver side apparatus 600.

The receiver side apparatus 600 calculates $$K = \prod_{i=1}^{d} \eta_{x,\tau(i)} \bmod N.$$

by use of the power multiplier 602, the residue operator 603 and the arithmetic unit 604.

(Seventh Embodiment)

The present embodiment is an example in which in the case where in the fourth embodiment the receiver $\underline{x}$ possesses an IC card 800 (see FIG. 9) having key information and connects the IC card 800 to the IC card connection unit 609 in the receiver side apparatus 600 (see FIG. 7) to obtain data from the broadcasting station, means for improving the efficiency of the calculation of the data enciphered key in the step (3) of the enciphering/deciphering process in the fourth embodiment is provided as in the sixth embodiment. Namely, a processing for calculation using confidential information is performed in the IC card 800 while a processing for calculation using no confidential information is performed in the receiver side apparatus 600.

(Eighth Embodiment)

The present embodiment corresponds to a specific case of the fourth embodiment.

A set R of receivers is $R = U_{\lambda \in \Lambda} R_\lambda$ for a family $\{R_\lambda\}_{\lambda \in \Lambda}$ of subsets and a server $S_\lambda$ is provided corresponding to each subset $R_\lambda$.

1. Preparatory Process

A broadcasting station generates the following information by use of the random number generator 501, the prime number generator 502, the arithmetic unit 503, the power multiplier 504 and the residue operator 505 in the broadcasting station side apparatus 500 (see FIG. 6).

Confidential information:

P, Q:prime number $e_i \in Z$, $0 < e_i < L = lcm\ (P-1, Q-1)$ $(1 \leq i \leq m)$ Public information:

N=PQ

The broadcasting station opens only the public information to the public.

Further, the broadcasting station generates $S_{x(\pi,\sigma)}=(S_{x,\pi_1(1)}, \ldots, S_{x,\pi_1(h)}, \ldots, S_{x,\pi_l(1)}, \ldots, S_{x,\pi_l(h)})$ by use of the random number generator 501 and distributes $S_{x,(\pi,\sigma)}$ as key information of a receiver $\underline{x}$. The broadcasting station generates a random number r' ($0 \leq r' \leq L$) for $\pi=(\pi_1, \ldots, \pi_l) \in R_{k,n}$, $\sigma=(\sigma_1, \ldots, \sigma_l) \in S_{k,n}$ by use of the random number generator 501 in the broadcasting station side apparatus 500 and calculates $r_{x,(\pi,\sigma)}=(r_{x,\pi_1(1)}, \ldots, r_{x,\pi_1(h)}, \ldots, r_{x,\pi_l(1)}, \ldots, r_{x,\pi_l(h)})$ satisfying $$\sum_{i=1}^{k} r_{x,\pi_i(j)} s_{x,\pi_i(j)} e_{\pi_i(j)} \equiv r' \pmod{L_{\sigma_i}} (1 \leq i \leq l)$$

by use of the arithmetic unit 503 and the residue operator 505. Therein, $L_{\sigma_i}$ satisfies $$L_{\sigma_i} = \text{ord}_N \left( \prod_{j=1}^{k} g_{\sigma_i(j)} \right) (1 \leq i \leq l).$$

Also, when $\sigma=(\sigma_1, \ldots, \sigma_l)$, $\sigma'=(\sigma'_1, \ldots, \sigma'_l) \in S'_{k,n}$ for n=kl, set $R_{k,n}=\{\pi=(\pi_1, \ldots, \pi_l) | \text{one-to-one map } \pi_i:\{1, 2, \ldots, h\} \to \{1, 2, \ldots, m\} (1 \leq i \leq l, 1 \leq h \leq m)\}$, set $S'_{k,n}=\{\sigma=(\sigma_1, \ldots, \sigma_l) | \text{one-to-one map } \sigma_i:A=\{1, 2, \ldots, k\} \to B=\{1, 2, \ldots, n\} (1 \leq i \leq l), \sigma_1(A) \cup \ldots \cup \sigma_l(A)=B\}$, a relation $$\sigma \sim \sigma' \overset{def}{\Leftrightarrow} \sigma_i(A) = \sigma'_{\tau(i)}(A)(1 \leq i \leq l)$$

is defined in regard to proper permutation $\tau$ on a set $\{1, 2, \ldots, l\}$. At this time, "~" represents an equivalent relation on $S'_{k,n}$ and $S_{kn}$ is $S_{k,n}=S'_{k,n}/\sim$.

2. Enciphering/Deciphering Process (1) The broadcasting station randomly selects an integer $\underline{r}$ ($0 \leq r \leq L$) by use of the random number generator 501 in the broadcasting station side apparatus 500 to generate a data enciphered key $K=f(g_1 g_2 \cdots g_n)^{r'} \mod N$ by use of the power multiplier 504, the residue operator 505 and the key generating unit 506. Further, the broadcasting station calculates $$W=(y_{ij}), y_{ij}=u_{ij}^r \mod N \ (1 \leq i \leq m, \ 1 \leq j \leq n)$$

and makes the multi-address transmission of an enciphered sentence $C=E(K:P)$ obtained by enciphering data P by the key K by use of the enciphering/deciphering unit 507 and the data W. Therein, $\underline{f}$ is a key generation function of a confidential key enciphering system opened to the public. Further, the broadcasting station generates $$V_\lambda = \{r_{x,(\pi,\sigma)} | x \in R_\lambda\}$$

for each $\lambda \in \Lambda$ by use of the arithmetic unit 503 and the residue operator 505 in the broadcasting station side apparatus 500, obtains an enciphered sentence $C_\lambda = E(K(S_\lambda):V_\lambda)$ by enciphering $V_\lambda$ by a key $K(S_\lambda)$ by use of the enciphering/deciphering unit 507 and transmits $C_\lambda$ to the server 700 $(S_\lambda)$ by use of the communication unit 508. The key $K(S_\lambda)$ is shared between the broadcasting station and the server 700 $(S_\lambda)$ beforehand.

(2) In order to see the data P, a receiver $\underline{x}$ uses the communication unit 606 in the receiver side apparatus 600 to make access to a server 700 (see FIG. 8) in an area to which the receiver belongs. And, the receiver uses the authentication unit 605 in the receiver side apparatus 600 (and the server 700 uses the authentication unit 704) to make the authentication by demonstrating the possession of the confidential information $s_\sigma$. If the authentication is materialized, the server 700 transmits $r_{x,(\pi,\sigma)}$ in the memory 703 to the receiver side apparatus 600 of the receiver $\underline{x}$ by use of the communication unit 701.

At this time, in the case where the data P is onerous, the server 700 performs a process for account to the receiver K by use of the accounting unit 705.

(3) The receiver side apparatus 600 of the receiver $\underline{x}$ calculates a data enciphered key K from $s_{x,(\pi,\sigma)}$ in the memory 601 by use of the power multiplier 602, the residue operator 603 and the key generating unit 607 in accordance with $$K = f \left( \prod_{i=1}^{l} \prod_{p=1}^{h} \prod_{q=1}^{k} y_{\pi_i(p)\sigma_i(q)} r_{x,\pi_i(p)} s_{x,\pi_i(p)} \mod N \right)$$

and deciphers the data P from the enciphered sentence C by use of the enciphering/deciphering unit 608.

Like the third embodiment, a method for authentication by the receiver $\underline{x}$ for the server 700 in (2) of the above-mentioned enciphering/deciphering process can rely upon a known authentication system, so far as it is a method with which the authentication is not materialized if the receiver $\underline{x}$ does not know $s_{x,(\pi,\sigma)}$.

The present invention is applicable to a multi-channel broadcasting satellite digital communication system, a TV conference system using a satellite, a CATV, a multi-media information distribution system, and so forth.

Accordingly, the present invention is not limited to the disclosed embodiments and includes various modifications in the scope of claims.

We claim:

1. A key distribution system in which a sender and a plurality of receivers use individual key information generated beforehand by a key generator to share a common key information for performing a secure broadcast communication, wherein (i) the key generator side is provided with:
   means for generating confidential information of a receiver in association with a subset inclusive of at least two elements of a first finite set S1 on the basis of a space determined by a subset inclusive of at least two elements of a second finite set S2; and
   means for distributing said confidential information to the receiver, (ii) the sender side is provided with:
   means for generating key distribution data corresponding to each element of said first finite set S1; and
   communication means for making the multi-address transmission of said key distribution data, and (iii) the receiver side is provided with:
   storage means for storing said confidential information beforehand; and
   means for calculating common key information K between the sender and the receiver from the stored confidential information for each receiver and the key distribution data.

2. A key distribution system in a limited secure broadcast communication in which a broadcasting station as a sender communicates with only receivers limited beforehand from among a plurality of receivers, wherein (i) the sender side is provided with:
   means for generating confidential information of a receiver in association with a subset inclusive of at least two elements of a finite set S;

means for distributing said confidential information to the receiver;
means for generating key distribution data corresponding to each element of said finite set S;
communication means for making the multi-address transmission of said key distribution data;
means for generating individual information for each receiver to be transmitted to only said limited receivers; and
communication means for transmitting said individual information for each limited receiver x, and (ii) the receiver $\underline{x}$ side is provided with:
means for storing said confidential information; and
means for calculating common key information K between the sender side and the receiver from said confidential information $s_x$ for each receiver distributed by said sender side, said key distribution data and said individual information.

3. A key distribution system according to claim 2, wherein said sender side is further provided wilt means for changing said key distribution data to change the value of said common key.

4. A key distribution system according to claim 2, wherein said receiver $\underline{x}$ side is provided with authentication means for making the authentication for the sender side by use of said confidential information $s_x$ in the case where transmit data is onerous indicating that a fee is charged, and said sender side is provided with communication means for transmitting said individual information $V_x$ if the authentication requested from the receiver side is materialized.

5. A key distribution system according to claim 1, wherein
(i) said key generator side comprises:
means for generating
$P_i$, $Q_i$:prime number $(1\leq i\leq m)$
$L_i=\text{lcm}(\text{ord}_{P_i}(g), \text{ord}_{Q_i}(g))$ $(1\leq i\leq m)$
$e_i\in Z$, $0<e_i<L=\text{lcm}(L_1, L_2, \ldots, L_m)$ $(1\leq i\leq n)$
as confidential information of the key generator;
means for generating
$N_i=P_iQ_i$ $(1\leq i\leq m)$
$g\in Z$, $0<g<N$

- $N = \prod_{i=1}^{m} N_i$

- $v_i = g^{h_i(e_1,\ldots,e_n)} \mod N (1 \leq i \leq M)$.

as public information of the key generator;
storage means for storing said confidential information and said public information;
means for acquiring key information of the key generator for $\sigma_x\in S$ and $\tau\in T$ from said storage means to calculate $S_{x,\tau}=(S_{x,\tau(1)}, S_{x,\tau(2)}, \ldots, S_{x,\tau(d)})$ satisfying $$\sum_{i=1}^{d} s_{x,\tau(i)}h_{\tau(i)}(e_1,\ldots,e_n) \equiv 1 (\text{mod } L_{\sigma_x});$$

means for distributing $s_{x,\tau}$ as key information of the receiver $\underline{x}$, wherein
$L_\sigma=\text{lcm}(L_{\sigma(1)}, L_{\sigma(2)}, \ldots, L_{\sigma(k)})$ $(\sigma\in S)$; $h_1(X_1, \ldots, X_n)$ $(1\leq i\leq M)$ represents a monomial of $X_1, \ldots, X_n$ on Z;
for set S'={f|one-to-one map f:A={1, 2, . . . , k}→B={1, 2, . . . , m}, m>K}, $\sigma_1$, $\sigma_2\in$S', a relation "~" on S' is defined as $$\sigma_1 \sim \sigma_2 \stackrel{def}{\Leftrightarrow} \sigma_1(A) = \sigma_2(A)$$

and a quotient set of S' concerning "~" is defined as S; and set T={f|one-to-one map f:A={1, 2, . . . , d}→B={1, 2, . . . , M}, M≧d};
means for randomly selecting for any receiver $\underline{x}$ an integer $\underline{r}$ which satisfies $$0<K=g^r \mod N,$$

$$\pi_x^r \mod N < \min\left\{N_\sigma = \prod_{i=1}^{k} N_{\sigma(i)} \,\bigg|\, \sigma \in s\right\};$$

means for calculating $$z_i=v_i^r \mod N \ (1\leq i\leq M)$$

as broadcast communication data from the public information of the key generator with the object of possessing K as a common key; and
communication means for making the multi-address transmission of said broadcast communication data, wherein $$\pi_x = g\sum_{i=1}^{d} s_{x,\tau(i)}h_{\tau(i)}(e_1,\ldots,e_n) \mod N,$$

and (ii) said receiver $\underline{x}$ side comprises:
means for calculating the common key K from said broadcast communication data and said confidential information $S_{x,\tau}=(S_{x,\tau(1)}, S_{x,\tau(2)}, \ldots, S_{x,\tau(d)})$ of the receiver $\underline{x}$ distributed by the key generator in accordance with $$K = \prod_{i=1}^{d} z_{\tau(i)} s_{x,\tau(i)} \mod N,$$

and wherein
Z represents a set of the whole of integers;
lcm(a,b) represents the lowest common multiple of integers $\underline{a}$ and $\underline{b}$,
$\text{ord}_p(g)$ represents the least integer $\underline{x}$ which satisfies $g^x\equiv 1(\text{mod } p)$; and
min {$a_1, a_2, \ldots, a_n$} represents the least value in $a_1, a_2, \ldots, a_n$ ($a_i\in Z$).

6. A key distribution system according to claim 1, 10 wherein
(i) said key generator side comprises:
means for generating
$P_i$, $Q_i$:prime number $(1\leq i\leq m)$
$e_i\in Z$, $0<e_i<L=\text{lcm}(L_1, L_2, \ldots, L_m)$ $(1\leq i\leq n)$
as confidential information of the key generator;
means for generating
$N_i=P_iQ_i$ $(1\leq i\leq m)$
$g_i\in Z$, $0<g_i<N$ $(1\leq i\leq M)$

- $N_i = P_iQ_i (1 \leq i \leq m)$

-continued

- $g_i \in Z, 0 < g_i < N (1 \le i \le M)$

- $N = \prod_{i=1}^{m} N_i$

- $V = (v_{ij}), v_{ij} = g_i^{h_j(e_1, \ldots, e_n)} \bmod N (1 \le i, j \le M).$ $V=(v_{ij})$, $v_{ij}=g_i^{h_j(e_1, \ldots, e_n)}$ mod N ($1 \le i,j \le M$),
as public information of the key generator;
storage means for storing said confidential information and said public information;
means for acquiring key information of the key generator for $\sigma_x=(\sigma_{x,1}, \ldots, \sigma_{x,a}) \in S$, $\sigma'_x=(\sigma'_{x,1}, \ldots, \sigma'_{x,a}) \in T$ from said storage means to calculate $S_{\sigma_x} = ((S\sigma_{x,1(1)}, S_{\sigma_{x,1}(2)}, \ldots, S_{\sigma_{x,1}(k)}), \ldots, (S_{\sigma_{x,a}(1)}, S_{\sigma_{x,a}(2)}, \ldots, S_{\sigma_{x,a}(k)}))$ satisfying $$\sum_{i=1}^{k} s_{\sigma_{x,j}(i)} h_{\sigma_{x,j}(i)}(e_1, \ldots, e_n) \equiv 1 (\bmod L_{\sigma'_{x,j}})(1 \le j \le a);$$

means for distributing $s_{\sigma_x}$ and $$N_{\sigma'_{x,i}} = \prod_{j=1}^{d} N_{\sigma'_{x,i}(j)}$$

as key information of the receiver $\underline{x}$, wherein $$L_{\sigma'_{x,i}} = \text{ord}_{N_{\sigma'_{x,i}}} \left( \prod_{j=1}^{k} g_{\sigma_{x,i}(j)} \right) (i = 1, \ldots, a); h_i(X_1, \ldots, X_n)$$

($1 \le i \le M$) represents a monomial of $X_1, \ldots, X_n$ on Z; for set $S'(M)=\{\sigma=(\sigma_1, \ldots, \sigma_a) | \text{one-to-one map } \sigma_i : A=\{1, 2, \ldots, k\} \to B=\{1, 2, \ldots, M\} (i=1, \ldots, a), \sigma_1(A) \cup \ldots \cup \sigma_a(A)=B, M=ak\}$, $\sigma=(\sigma_1, \ldots, \sigma_a)$, $\sigma'=(\sigma'_1, \ldots, \sigma'_a) \in S'(M)$, a relation of $$\sigma \sim \sigma' \stackrel{def}{\iff} \{\sigma_1(A), \ldots, \sigma_a(A)\} = \{\sigma'_1(A), \ldots, \sigma'_a(A)\}$$

is defined and a quotient set of S'(M) concerning "~" is defined as S; and a quotient set of m=ad, S'(m) concerning "~" is defined as T;
means for randomly selecting for any receiver $\underline{x}$ an integer $\underline{r}$ which satisfies $$K = \left( \prod_{i=1}^{M} g_i \right)^r \bmod N,$$

$$0 < \left( \prod_{j=1}^{k} g_{\sigma_{x,i}(j)} \right)^r \bmod N \le \min\{N_{\sigma'_{x,i}} | \forall x, \sigma'_x\}$$

means for calculating broadcast communication data $W=(w_{ij})$, $w_{ij}=v_{ij}^r$ mod N ($1 \le i,j \le M$)
from the public information of the key generator with the object of possessing K as a common key; and
communication means for making the multi-address transmission of said broadcast communication data, and (ii) said receiver $\underline{x}$ side comprises:

means for calculating the common key K from said broadcast communication data and said confidential information $S_{\sigma_x}$ of the receiver $\underline{x}$ distributed by the key generator in accordance with $$K = \prod_{i=1}^{a} k_i \bmod N,$$

wherein $$K_t = \prod_{i=1}^{k} \left( \prod_{j=1}^{k} w_{\sigma_{x,t}(j)\sigma_{x,t}(i)} \right)^{s_{\sigma_{x,t}(i)}} \bmod N_{\sigma'_{x,t}}$$

and wherein
Z represents a set of the whole of integers;
lcm(a,b) represents the lowest common multiple of integers $\underline{a}$ and $\underline{b}$; and
$\text{ord}_N(g)$ represents the least integer $\underline{x}$ which satisfies $g^x \equiv 1 (\bmod N)$ for integers N and $\underline{g}$.

7. A key distribution system according to claim 2, wherein
(i) said broadcasting station side comprises:
means for generating
$P_i$, $Q_i$: prime number ($1 \le i \le m$)
$L_i = \text{lcm}(\text{ord}_{P_i}(g), \text{ord}_{Q_i}(g))$ ($1 \le i \le m$)
$e_i \in Z$, $0 < e_i < L = \text{lcm}(L_1, L_2, \ldots, L_m)$ ($1 \le i \le n$)
as confidential information of the broadcasting station;
means for generating

- $N_i = P_i Q_i (1 \le i \le m)$

- $g \in Z, 0 < g < N$

- $N = \prod_{i=1}^{m} N_i$

- $v_i = g^{h_i(e_1, \ldots, e_n)} \bmod N (1 \le i \le M).$ as public information of the broadcasting station;
storage means for storing said confidential information and said public information;
means for generating random numbers r' (0<r'<L);
means for acquiring key information of the broadcasting station for $\sigma_x \in S$ and $\tau \in T$ from said storage means to calculate $S_{x,\tau}=(S_{x,\tau(1)}, S_{x,\tau(2)}, \ldots, S_{x,\tau(d)})$, $U_{x,\tau}=(U_{x,\tau(1)}, U_{x,\tau(2)}, \ldots, U_{x,\tau(d)})$ satisfying $$\sum_{i=1}^{d} u_{x,\tau(i)} s_{x,\tau(i)} h_{\tau(i)}(e_1, \ldots, e_n) \equiv r' (\bmod L_{\sigma_x})$$

means for distributing $s_{x,\tau}$ as key information of the receiver $\underline{x}$, wherein $L_\sigma = \text{lcm}(L_{\sigma(1)}, L_{\sigma(2)}, \ldots, L_{\sigma(k)})$ ($\sigma \in S$); $h_i(X_1, \ldots, X_n)$ ($1 \le i \le M$) represents a monomial of $X_1, \ldots, X_n$ on Z; for set $S'=\{f | \text{one-to-one map } f:A=\{1, 2, \ldots, k\} \to B=\{1, 2, \ldots, m\}, m \ge K\}$, $\sigma_1, \sigma_2 \in S'$, a relation "~" on S' is defined as $\sigma_1 \sim \sigma_2$ $$\sigma_1 \sim \sigma_2 \stackrel{def}{\iff} \sigma_1(A) = \sigma_2(A)$$

and a quotient set of S' concerning "~" is defined as S; and set $T=\{f | \text{one-to-one map } f:A=\{1, 2, \ldots, d\} \to B=\{1, 2, \ldots, M\}, M \ge d\}$;

means for randomly selecting for any receiver x an integer $\underline{r}$ ($0 \leq r \leq L$) which satisfies $0 < K = g^{rr'} \mod N$, $$\pi_x^{r'} \mod N < \min \left\{ N_\sigma = \prod_{i=1}^{k} N_{\sigma(i)} \mid \sigma \in S \right\}$$

means for acquiring the key information of the broadcasting station from said storage means of said broadcasting station side to calculate $$z_i = v_i^r \mod N \ (1 \leq i \leq M)$$

with the object of sharing a key K in common with the limited receivers;

communication means for making the multi-address transmission of $z_i$ ($1 \leq i \leq M$), wherein $$\pi_x = g^{\sum_{i=1}^{d} u_{x,\tau(i)} s_{x,\tau(i)} h_{\tau(i)}(e_1, \ldots, e_n)} \mod N;$$

and communication means for transmitting $u_{x,\tau} = (u_{x,\tau(1)}, u_{x,\tau(2)}, \ldots, u_{x,\tau(d)})$ to the limited receivers, and (ii) said receiver x side comprises:

means for calculating the common key K from the broadcast communication data, said confidential information $s_{x,\tau}$ the receiver $\underline{x}$ distributed by the broadcasting station and $u_{x,\tau}$ in accordance with $$K = \prod_{i=1}^{d} z_{\tau(i)}^{u_{x,\tau(i)} s_{x,\tau(i)}} \mod N,$$

and wherein

Z represents a set of the whole of integers;

lcm(a,b) represents the lowest common multiple of integers $\underline{a}$ and $\underline{b}$; and $\text{ord}_p(g)$ represents the least integer $\underline{x}$ which satisfies $g^x \equiv 1 \pmod{p}$.

8. A key distribution system according to claim 2, wherein (i) said broadcasting station side comprises:

means for generating $P_i, Q_i$: prime number ($1 \leq i \leq m$)

$e_i \in Z, 0 < e_i < L = \text{lcm}(L_1, L_2, \ldots, L_m)$ ($1 \leq i \leq n$)

as confidential information of the broadcasting station;

means for generating $N_i = P_i Q_i$ ($1 \leq i \leq m$)

$g_i \in Z, 0 < g_i < N$ ($1 \leq i \leq M$)

• $N = \prod_{i=1}^{m} N_i$ $V = (v_{ij})$, $v_{ij} = g_i^{h_j(e_1, \ldots, e_n)} \mod N$ ($1 \leq i,j \leq M$)

as public information of the broadcasting station;

storage means for storing said confidential information and said public information of the broadcasting station;

means for generating random numbers r' ($0 < r' < L$);

means for acquiring key information of the broadcasting station for $\sigma_x = (\sigma_{x,1}, \ldots, \sigma_{x,a}) \in S$, $\sigma'_x = (\sigma'_{x,1}, \ldots, \sigma'_{x,a}) \in T$ from said storage means of said broadcasting station side to calculate $S_{\sigma_x} = ((S_{\sigma_{x,1}(1)}, S_{\sigma_{x,1}(2)}, \ldots, S_{\sigma_{x,1}(k)}), \ldots, (S_{\sigma_{x,a}(1)}, S_{\sigma_{x,a}(2)}, \ldots, S_{\sigma_{x,a}(k)}))$, $U_{\sigma_x} = ((U_{\sigma_{x,1}(1)}, U_{\sigma_{x,1}(2)}, \ldots, U_{\sigma_{x,1}(k)}), U_{\sigma_{x,a}(1)}, U_{\sigma_{x,a}(2)}, \ldots, U_{\sigma_{x,a}(k)}))$ satisfying $$\sum_{i=1}^{k} u_{\sigma_{x,j}(i)} s_{\sigma_{x,j}(i)} h_{\sigma_{x,j}(i)}(e_1, \ldots, e_n) \equiv r \pmod{L_{\sigma'_{x,j}}}$$

($1 \leq j \leq a$)

means for distributing $s_{x,\tau}$ and $$N_{\sigma'_{x,i}} = \prod_{j=1}^{d} N_{\sigma'_{x,i}(j)} (i = 1, \ldots, a)$$

as key information of the receiver $\underline{x}$, wherein $$L_{\sigma'_{x,i}} = \text{ord}_{N_{\sigma'_{x,i}}} \left( \prod_{j=1}^{k} g_{\sigma_{x,i}(j)} \right), (i = 1, \ldots, a);$$

$h_i(X_1, \ldots, X_n)$ ($1 \leq i \leq M$) represents a monomial of $X_1, \ldots, X_n$ on Z; for set $S(M) = \{\sigma = (\sigma_1, \ldots, \sigma_a) | \text{one-to-one map } \sigma_i : A = \{1, 2, \ldots, k\} \rightarrow B = \{1, 2, \ldots, M\} (i=1, \ldots, a), \sigma_1(A) \cup \ldots \cup \sigma_a(A) = (B), M = ak\}$, $\sigma = (\sigma_1, \ldots, \sigma_a)$, $\sigma' = (\sigma'_1, \ldots, \sigma'_a) \in S(M)$, a relation of $$\sigma \sim \sigma' \stackrel{def}{\Longleftrightarrow} \{\sigma_1(A), \ldots, \sigma_a(A)\} = \{\sigma'_1(A), \ldots, \sigma'_a(A)\}$$ is defined and a quotient set of S(M) concerning "~" is defined as S; and a quotient set of m=ad, S(m) concerning "~" is defined as T;

means for randomly selecting for any receiver $\underline{x}$ an integer $\underline{r}$ ($0 \leq r \leq L$) which satisfies $$K = \left( \prod_{i=1}^{M} g_i \right)^{rr'} \mod N,$$

$$0 < \left( \prod_{j=1}^{k} g_{\sigma_{x,i}(j)} \right)^{rr'} \mod N \leq \min \{ N_{\sigma'_{x,i}} | \forall x, \sigma'_x \}$$

($i = 1, \ldots, a$)

(i=1, . . . a)

means for acquiring the key information of the broadcasting station from said storage means of said broadcasting station side to calculate $W = (w_{ij})$, $w_{ij} = v_{ij} = ij^r \mod N$ ($1 \leq i,j \leq M$)

with the object of sharing a key K in common with the limited receivers;

communication means for making the multi-address transmission of W; and communication means for transmitting $U_{\sigma_x} = ((u_{\sigma_{x,1}(1)}, u_{\sigma_{x,1}(2)}, \ldots, u_{\sigma_{x,1}(k)}), \ldots, (u_{\sigma_{x,a}(1)}, u_{\sigma_{x,a}(2)}, \ldots, u_{\sigma_{x,a}(k)}))$ to the limited receivers;

and (ii) said receiver $\underline{x}$ side comprises:
  means for calculating the common key K from the broadcast communication data, said confidential information $s_{\sigma_x}$ of the receiver $\underline{x}$ distributed by the broadcasting station and $u_{\sigma_x}$ in accordance with $$K = \prod_{i=1}^{a} k_i \bmod N,$$

wherein $$K_t = \prod_{i=1}^{k} \left( \prod_{j=1}^{k} w_{\sigma_{x,t}(j)\sigma_{x,t}(i)} \right)^{u_x s_{\sigma_{x,t}(i)}} \bmod N_{\sigma'_{x,t}}$$

$(1 \leq t \leq a)$, and wherein
  Z represents a set of the whole of integers;
  lcm(a,b) represents the lowest common multiple of integers $\underline{a}$ and $\underline{b}$; and
  $\text{ord}_N(g)$ represents the least integer $\underline{x}$ which satisfies $g^x \equiv 1 (\bmod N)$ for integers N and $\underline{g}$.

9. A key distribution system according to claim 5, wherein said key generator side further comprises means for selecting the key information $s_{x,\tau}$ of the receiver $\underline{x}$ to satisfy a condition of $$\pi_x \neq g$$

for any receiver x.

10. A key distribution system according to claim 6, wherein said key generator side further comprises means for selecting the key information $s_{\sigma_x}$ of the receiver $\underline{x}$ to satisfy so that $$\sum_{i=1}^{k} s_{\sigma_{x,j}(i)} h_{\sigma_{x,j}(i)}(e_1, \ldots, e_n) \not\equiv 1 (\bmod \tilde{L}_{\sigma'_{x,j}}),$$

$$\tilde{L}_{\sigma'_{x,j}} = lcm\left(\text{ord}_{N_{\sigma'_{x,j}}}\left(g_{\sigma_{x,j}(1)}\right), \ldots, \text{ord}_{N_{\sigma'_{x,j}}}\left(g_{\sigma_{x,j}(k)}\right)\right)$$

$(j = 1, \ldots, a)$ is satisfied.

11. A key distribution system according to claim 8, wherein said broadcasting station side further comprises means for selecting the key information $s_{\sigma x}$ of the receiver $\underline{x}$ to satisfy so that $$\sum_{i=1}^{k} u_{\sigma_{x,j}(i)} s_{\sigma_{x,j}(i)} h_{\sigma_{x,j}(i)}(e_1, \ldots, e_n) \not\equiv r' (\bmod \tilde{L}_{\sigma'_{x,j}})$$

$$\tilde{L}_{\sigma'_{x,j}} = lcm\left(\text{ord}_{N_{\sigma'_{x,j}}}\left(g_{\sigma_{x,j}(1)}\right), \ldots, \text{ord}_{N_{\sigma'_{x,j}}}\left(g_{\sigma_{x,j}(k)}\right)\right)$$

$(j = 1, \ldots, a)$ is satisfied.

12. A key distribution system according to claim 7, wherein said broadcasting station side further comprises means for changing the value of the common key K by changing the value of $\underline{r}$ of the common key $K = g^{rr'} \bmod N$.

13. A key distribution system according to claim 7, wherein said broadcasting station side further comprises means for identifying transmit data by taking the value of r' of the common key $K = g^{rr'} \bmod N$ as a value characteristic of the transmit data.

14. A key distribution system according to claim 7, wherein the limited receiver $\underline{x}$ side comprises authentication means for making the authentication for the broadcasting station side by use of the confidential information $s_{x,\tau}$ and means for receiving $u_{x,\tau}$ after the authentication is made by said authentication means, and wherein the broadcasting station side comprises accounting means by which in the case where data P enciphered using the common key K is onerous indicating that a fee is charged, a process for account of a charge for P to the receiver $\underline{x}$ is performed.

15. A key distribution system according to claim 7, wherein in the case where the receiver $\underline{x}$ possesses a storage medium with a computing function having the confidential key $s_{x,\tau}$ and connects said storage medium to a receiving unit having a higher computing function to calculate the common key $$K = \prod_{i=1}^{d} z_{\tau(i)} u_{x,\tau(i)} s_{x,\tau(i)} \bmod N,$$

said receiving unit comprises:
  means for performing the calculation of $$\xi_{x,\tau(i)} = z_{\tau(i)}^{u_{x,\tau(i)}} \bmod N \ (1 \leq i \leq d);$$

means for outputting $\xi_{x,\tau(i)}$ $(1 \leq i \leq d)$ to said storage medium; and
  means for performing the calculation of $$K = \prod_{i=1}^{d} \eta_{x,\tau(i)} \bmod N$$

on the basis of information from said storage medium, and said storage medium comprises:
  means for performing the calculation of $$\eta_{x,\tau(i)} = \xi_{x,\tau(i)}^{s_{x,\tau(i)}} \bmod N \ (1 \leq i \leq d)$$

on the basis of information from said receiving unit; and
  means for outputting $\eta_{x,\tau(i)}$ $(1 \leq i \leq d)$ to said receiving unit.

16. A key distribution system according to claim 8, wherein in the case where the receiver $\underline{x}$ possesses a storage medium with a computing function having the confidential key $s_{\sigma_x}$ and connects said storage medium to a receiving unit having a higher computing function to calculate the common key K, said storage medium comprises means for performing a calculation using confidential information, and said receiving unit comprises means for means for performing a calculation using no confidential information.

17. A key distribution system according to claim 2, wherein
  (i) said broadcasting station side comprises:
    means for generating
      $P_i, Q_i$:prime number
      $e_i \in Z$, $0 < e_i < L = lcm(P-1, Q-1)$ $(1 \leq i \leq m)$
    as confidential information of the broadcasting station;
    means for generating
      $N = PQ$
    as public information of the broadcasting station;
    storage means for storing said confidential information and said public information;

means for generating random numbers r ∈Z, π=(π$_1$, . . . , π$_l$) ∈R$_{k,n}$;

means for acquiring key information of the broadcasting station for σ=(σ$_1$, . . . , σ$_l$) ∈S$_{k,n}$ from said storage means of said broadcasting station side to calculate S$_{x,\tau(\pi,\sigma)}$=(S$_{x,\pi_1(1)}$, . . . , S$_{x,\pi_1(h)}$, . . . , S$_{x,\pi_l(1)}$, . . . , S$_{x,\pi_l(h)}$), r$_{x,(\pi,\sigma)}$=(r$_{x,\pi_1(1)}$, . . . , r$_{x,\pi_1(h)}$, . . . , r$_{x,\pi_l(1)}$, . . . , r$_{x,\pi_l(h)}$) satisfying $$\sum_{i=1}^{k} r_{x,\pi_i(j)} s_{x,\pi_i(j)} e_{\pi_i(j)} \equiv r'(\mathrm{mod}\, L_{\sigma_i})\ (1 \leq i \leq l);$$

means for distributing s$_{x,(\pi,\sigma)}$ as key information of the receiver x, wherein $$L_{\sigma_i} = \mathrm{ord}_N \left( \prod_{j=1}^{k} g_{\sigma_i(j)} \right) (1 \leq i \leq l);$$

when σ=(σ(σ$_1$, . . . , σ$_l$), (σ'$_1$, . . . , σ'$_l$), ∈S'$_{k,n}$ for n=kl, set R$_{k,n}$={π=(π$_1$, . . . , π$_l$)|one-to-one map π$_i$:{1, 2, . . . , h}→{1, 2, . . . , m}(1≦i≦l,1≦h≦m)}, set S'$_{k,n}$={σ=(σ$_1$, . . . , σ$_l$)|one-to-one map σ$_i$:A={1, 2, . . . , k}→B={1, 2, . . . , n}(1≧i≧l), σ$_1$ (A) U . . . Uσ$_l$ (A)=B}, a relation of $$\sigma \sim \sigma' \overset{def}{\iff} \sigma_i(A) = \sigma'_{\tau(i)}(A)\ (1 \leq i \leq l)$$

is defined in regard to proper permutation τ on a set {1, 2, . . . , l}, "~" representing an equivalent relation on S and S'$_{k,n}$ being S$_{k,n}$=S'$_{k,n}$/~;

means for randomly selecting r∈Z for g$_i$∈Z (0<g$_i$<N, 1≦i≦n=kl) in said storage means of said broadcasting station side;

means for calculating $$K = \prod_{i=1}^{n} g_i^{rr'} \mathrm{mod}\, N$$

means for acquiring the key information of the broadcasting station from said storage means of said broadcasting station side to calculate $$y_{ij}=u_{ij}^{r'} \mathrm{mod}\, N\ (1 \leq i \leq m,\ 1 \leq j \leq n)$$

with the object of sharing a key K in common with only the limited receivers;

means for making the multi-address transmission of y$_{ij}$ (1≦i≦m, 1≦j≦n); and means for transmitting r$_{x,(\pi,\sigma)}$=(r$_{x,\pi_1(1)}$, . . . , r$_{x,\pi_1(h)}$, . . . , r$_{x,\pi_l(1)}$, . . . , r$_{x,\pi_l(h)}$) to the limited receivers x, and (ii) said receiver x side comprises:

means for calculating the common key K from the broadcast communication data, said confidential information s$_{x,(\pi,\sigma)}$ of the receiver x distributed by the broadcasting station and r$_{x,(\pi,\sigma)}$ in accordance with $$K = \prod_{i=1}^{l} \prod_{p=1}^{h} \prod_{q=1}^{k} y_{\pi_i(p)\sigma_i(q)}^{r_{x,\pi_i(p)} s_{x,\pi_i(p)}} \mathrm{mod}\, N,$$

and wherein

Z represents a set of the whole of integers;

lcm(a,b) represents the lowest common multiple of integers a and b; and ord$_N$(g) represents the least positive integer x which satisfies g$^x$≡1(mod N) for integers N and g.

18. A key distribution system according to claim 7, wherein said broadcasting station side further comprises means for selecting the key information s$_{x,\tau}$ of the receiver x to satisfy a condition of $$\pi_x \neq g$$

for any receiver x.

19. A key distribution system according to claim 8, wherein said broadcasting station side further comprises means for changing the value of the common key K by changing the value of r of the common key K=g$^{rr'}$ mod N.

20. A key distribution system according to claim 8, wherein said broadcasting station side further comprises means for identifying transmit data by taking the value of r' of the common key K=g$^{rr'}$ mod N as a value characteristic of the transmit data.

21. A key distribution system according to claim 8, wherein the limited receiver x side comprises authentication means for making the authentication for the broadcasting station side by use of the confidential information s$_{\alpha x'}$ and means for receiving u$_{\alpha x'}$ after the authentication is made by said authentication means, and wherein the broadcasting station side comprises accounting means by which in the case where data P enciphered using the common key K is onerous indicating that a fee is charged, a process for account of a charge for P to the receiver x is performed.

22. A key distribution method in which a sender and a plurality of receivers use individual key information generated beforehand by a key generator to share a common key information for performing a secure broadcast communication, wherein (i) the key generator side is provided with the steps of:
generating confidential information of a receiver in association with a subset inclusive of at least two elements of a first finite set SI on the basis of a space determined by a subset inclusive of at least two elements of a second finite set S2; and
distributing said confidential information to the receiver, (ii) the sender side is provided with:
generating key distribution data corresponding to each element of said first finite set S1; and
making the multi-address transmission of said key distribution data, and (iii) the receiver side is provided with the steps of:
storing said confidential information beforehand; and
calculating common key information K between the sender and the receiver from the stored confidential information for each receiver and the key distribution data.

23. A key distribution method for sharing common key information in a limited secure broadcast communication in which a broadcasting station as a sender communicates wits only receivers limited from among a plurality of receivers, wherein (i) the sender side is provided with the steps of:
generating confidential information of a receiver in association with a subset inclusive of at least two elements of a finite set S;
distributing said confidential information to the receiver;
generating key distribution data corresponding to each element of said finite set S;
making the multi-address transmission of said key distribution data;
generating individual information for each receiver to be transmitted to only said limited receivers; and
transmitting said individual information for each limited receiver $\underline{x}$,
and (ii) the receiver $\underline{x}$ side is provided with:
a step of calculating common key information K between the sender side and the receiver from said confidential information $s_x$ for each receiver distributed by said sender side, said key distribution data and said individual information.

24. A key distribution method according to claim 23, wherein said sender side is further provided with a step of changing said key distribution data to change the value of said common key.

25. A key distribution method according to claim 23, wherein said receiver $\underline{x}$ side is provided with a step of for making the authentication for the sender side by use of said confidential information $s_x$ in the case where transmit data is onerous indicating that a fee is charged, and said sender side is provided with a step of transmitting said individual information $V_x$ if the authentication requested from the receiver side is materialized.

26. A key distribution method according to claim 22, wherein
(i) as a preparatory process,
said key generator side is provided with the steps of:
generating
$P_i$, $Q_i$: prime number ($1 \leq i \leq m$)
$L_i = \text{lcm}(\text{ord}_{P_i}(g), \text{ord}_{Q_i}(g))$ ($1 \leq i \leq m$)
$e_i \in Z$, $0 < e_i < L = \text{lcm}(L_1, L_2, \ldots, L_m)$ ($1 \leq i \leq n$)
as confidential information of the key generator;
generating

- $N_i = P_i Q_i$ ($1 \leq i \leq m$)
- $g \in Z$, $0 < g < N$
- $N = \prod_{i=1}^{m} N_i$
- $v_i = g^{h_i(e_1, \ldots, e_n)} \mod N$ ($1 \leq i \leq M$).

as public information of the key generator;
storing said confidential information and said public information of said key generator into storage means;
acquiring key information of the key generator for $\sigma_x \in S$ and $\tau_x \in T$ from said storage means to calculate $S_{x,\tau} = (S_{x,\tau(1)}, S_{x,\tau(2)}, \ldots, S_{x,\tau(d)})$, satisfying $$\sum_{i=1}^{d} S_{x,\tau(i)} h_{\tau(i)}(e_1, \ldots, e_n) \equiv 1 \pmod{L_{\sigma_x}};$$

distributing $s_{x,\tau}$ as key information of the receiver $\underline{x}$, wherein $L_\sigma = \text{lcm}(L_{\sigma(1)}, L_{\sigma(2)}, \ldots, L_{\sigma(k)})$ ($\sigma \in S$); $h_i(X_1, \ldots, X_n)$ ($1 \leq i \leq M$) represents a monomial of $X_1, \ldots, X_n$ on Z; for set $S' = \{f | \text{one-to-one map } f: A = \{1, 2, \ldots, k\} \to B = \{1, 2, \ldots, m\}, m \geq K\}$, $\sigma_1, \sigma_2 \in S'$, a relation "~" on S' is defined as $$\sigma_1 \sim \sigma_2 \overset{def}{\iff} \sigma_{1(A)} = \sigma_{2(A)}$$

and a quotient set of S' concerning "~" is defined as S; and set $T = \{f | \text{one-to-one map } f: A = \{1, 2, \ldots, d\} \to B = \{1, 2, \ldots, M\}, M \geq d\}$,
and (ii) as a key distribution process,
(1) the sender side is provided with the steps of:
randomly selecting for any receiver $\underline{x}$ an integer $\underline{r}$ which satisfies $0 < K = g^r \mod N$, $$\pi_x^r \mod N < \min\left\{N_\sigma = \prod_{i=1}^{k} N_{\sigma(i)} \,\middle|\, \sigma \in S\right\};$$

calculating $z_i = v_i^r \mod N$ ($1 \leq i \leq M$)

as broadcast communication data from the public information of the key generator with the object of possessing K as a common key; and
making the multi-address transmission of said broadcast communication data, wherein $$\pi_x = g \sum_{i=1}^{d} S_{x,\tau(i)} h_{\tau(i)}(e_1, \ldots, e_n) \mod N,$$

and (2) said receiver $\underline{x}$ side is provided with:
a step of calculating the common key K from said broadcast communication data and said confidential information $S_{x,\tau} = (S_{x,\tau(1)}, S_{x,\tau(2)}, \ldots, S_{x,\tau(d)})$ of the receiver $\underline{x}$ distributed by the key generator in accordance with $$K = \prod_{i=1}^{d} z_{\tau(i)} s_{x,\tau(i)} \mod N,$$

and wherein
Z represents a set of the whole of integers;
lcm(a,b) represents the lowest common multiple of integers $\underline{a}$ and $\underline{b}$;
$\text{ord}_p(g)$ represents the least integer $\underline{x}$ which satisfies $g^x \equiv 1 \pmod{p}$; and
min $\{a_1, a_2, \ldots, a_n\}$ represents the least value in $a_1, a_2, \ldots, a_n$ ($a_i \in Z$).

27. A key distribution method according to claim 22, wherein
(i) as a preparatory process,
said key generator side is provided with the steps of:
generating
$P_i$, $Q_i$: prime number ($1 \leq i \leq m$)
$e_i \in Z$, $0 < e_i < L = \text{lcm}(L_1, L_2, \ldots, L_m)$ ($1 \leq i \leq n$)
as confidential information of the key generator;
generating
$N_i = P_i Q_i$ ($1 \leq i \leq m$)

$g_i \in Z$, $0 < g_{i<N}$ ($1 \leq i \leq M$)

$$\bullet N = \prod_{i=1}^{m} N_i$$

$V = (v_{ij})$, $v_{ij} = g_i^{h_i(e_1, \ldots, e_n)} \bmod N$ ($1 \leq i,j \leq M$)
as public information of the key generator;
storing said confidential information and said public information of the key generator into storage means;
acquiring key information of the key generator for $\sigma_x = (\sigma_{x,1}, \ldots, \sigma_{x,a}) \in S$, $\sigma'_x = (\sigma'_{x,1}, \ldots, \sigma'_{x,a}) \in T$ from said storage means to calculate $S_{\sigma_x} = ((S_{\sigma_{x,1}(1)}, S_{\sigma_{x,1}(2)}, \ldots, S_{\sigma_{x,1}(k)}), \ldots, (S_{\sigma_{x,a}(1)}, S_{\sigma_{x,1}(1)}, S_{\sigma_{x,1}(k)}))$ satisfying $$\sum_{i=1}^{k} s_{\pi_{x,j}(i)} h_{\sigma_{x,j}(i)}(e_1, \ldots, e_n) \equiv 1 \;(\bmod\; L_{\sigma'_{x,j}})\; (1 \leq j \leq a);$$

and distributing $s_{\sigma_x}$ and $$N_{\sigma'_{x,i}} = \prod_{j=1}^{d} N_{\sigma'_{x,i}(j)} \; (i = 1, \ldots, a)$$

as key information of the receiver $\underline{x}$, wherein $$L_{\sigma'_{x,i}} = \mathrm{ord}_{N_{\sigma'_{x,i}}} \left( \prod_{j=1}^{k} g_{\sigma_{x,i}(j)} \right);$$

($i = 1, \ldots, a$); $h_i(X_1, \ldots, X_n)$ ($1 \leq i \leq M$)

($i=1, \ldots, a$); $h_i(X_1, \ldots, X_n)$ ($1 \leq i \leq M$) represents a monomial of $X_1, \ldots, X_2$ on Z; for set $S'(M) = \{\sigma = (\sigma_1, \ldots, \sigma_a) | \text{one-to-one map } \sigma_i: A = \{1, 2, \ldots, k\} \to B = \{1, 2, \ldots, M\} (i=1, \ldots, a), \sigma_1(A) \cup \ldots \cup \sigma_a(A) = B, M = ak\}$, $\sigma = (\sigma_1, \ldots, \sigma_a)$, $\sigma' = (\sigma'_1, \ldots, \sigma'_a) \in S'(M)$, a relation of $$\sigma \sim \sigma' \stackrel{\text{def}}{\Longleftrightarrow} \{\sigma_1(A), \ldots, \sigma_a(A)\}$$

$\ldots, \sigma_a(A)\} = \{\sigma'_1(A), \ldots, \sigma'_a(A)\}$ is defined and a quotient set of $S'(M)$ concerning "~" is defined as S; and a quotient set of m=ad, $S'(m)$ concerning "~" is defined as T;
and (ii) as a key distribution process,
(1) the sender side is provided with the steps of:
randomly selecting for any receiver $\underline{x}$ an integer $\underline{r}$ which satisfies $$K = \left( \prod_{i=1}^{M} g_i \right)^r \bmod N,$$

$$0 < \left( \prod_{j=1}^{k} g_{\sigma'_{x,i}(j)} \right)^r \bmod N \leq \min\{N_{\sigma'_{x,i}} | \forall x, \sigma'_x\} \; (i = 1, \ldots, a);$$

calculating broadcast communication data $W = (w_{ij})$, $w_{ij} = v_{ij} \bmod N$ ($1 \leq i \leq M$)

from the public information of the key generator with the object of possessing K as a common key; and making the multi-address transmission of said broadcast communication data,
and (2) said receiver $\underline{x}$ side is provided with:
calculating the common key K from said broadcast communication data and said confidential information $s_{\sigma_x}$ of the receiver $\underline{x}$ distributed by the key generator in accordance with $$K = \prod_{i=1}^{a} k_i \bmod N$$

wherein $$K_t = \prod_{i=1}^{k} \left( \prod_{j=1}^{k} w_{\sigma_{x,t}(j)\sigma_{x,t}(i)} \right)^{s_{\sigma_{x,t}(i)}} \bmod N_{\sigma'_{x,t}} \;(1 \leq t \leq a),$$

and wherein
Z represents a set of the whole of integers;
lcm(a,b) represents the lowest common multiple of integers $\underline{a}$ and $\underline{b}$; and
$\mathrm{ord}_N(g)$ represents the least integer x which satisfies $g^x \equiv 1 \pmod N$ for integers N and g.

28. A key distribution method according to claim 23, wherein
(i) as a preparatory process, said broadcasting station side is provided with the steps of:
generating
$P_i$, $Q_i$: prime number ($1 \leq i \leq m$)
$L_i = \mathrm{lcm} \; (\mathrm{ord}_{P_i}(g), \mathrm{ord}_{Q_i}(g))$ ($1 \leq i \leq m$)
$e_i \in Z$, $0 < e_i < L = \mathrm{lcm}\;(L_1, L_2, \ldots, L_m)$ ($1 \leq i \leq n$)
as confidential information of the broadcasting station;
generating $\bullet N_i = P_i Q_i$ ($1 \leq i \leq m$)

$\bullet g \in Z$, $0 < g < N$ $$\bullet N = \prod_{i=1}^{m} N_i$$

$\bullet v_i = g^{h_i(e_1, \ldots, e_n)} \bmod N$ ($1 \leq i \leq m$)

as public information of the broadcasting station;
storing said confidential information and said public information into storage means;
generating random numbers r' ($0 < r' < L$);
acquiring key information of the broadcasting station for $\sigma_x \in S$ and $\tau \in T$ from said storage means to calculate $S_{x,\tau} = (S_{x,\tau(1)}, S_{x,\tau(2)}, \ldots, S_{x,\tau(d)})$, $u_{x,\tau} = (u_{x,\tau(1)}, u_{x,\tau(2)}, \ldots, u_{x,\tau(d)})$ satisfying $$\sum_{i=1}^{d} u_{x,\tau(i)} s_{x,\tau(i)} h_{\tau(i)}(e_1, \ldots, e_n) \equiv r' \;(\bmod\; L_{\sigma_x});$$

and
distributing $s_{x,\tau}$ as key information of the receiver x, wherein $L_\sigma = \mathrm{lcm}\;(L_{\sigma(1)}, L_{\sigma(2)}, L_{\sigma(k)})$ ($\sigma \in S$); $h_i(X_1, \ldots, X_n)$ ($1 \leq i \leq M$) represents a monomial of $X_1, \ldots, X_n$ on Z; for set $S' = \{f | \text{one-to-one map } f: A = \{1, 2, \ldots, k\} \to B = \{1, 2, \ldots, m\}, m \geq K\}$, $\sigma_1, \sigma_2 \in S'$, a relation "~" on S' is defined as $$\sigma_1 \sim \sigma_2 \overset{def}{\Longleftrightarrow} \sigma_1(A) = \sigma_2(A).$$

and a quotient set of S' concerning "~" is defined as S, and set T={f|one-to-one map f:A={1, 2, . . . , d}→B={1, 2, . . . , M}, M≧d}, and (ii) as a key distribution process, (1) said broadcasting station side is provided with the steps of:

randomly selecting for any receiver $\underline{x}$ an integer $\underline{r}$ (0<r<L) which satisfies $$0 < K = g^{rr'} \mod N,$$

$$\pi_x^{rr'} \mod N < \min\left\{ N_\sigma = \prod_{i=1}^{k} N_{\sigma(i)} \,\middle|\, \sigma \in S \right\}$$

acquiring the key information of the broadcasting station from said storage means of said broadcasting station side to calculate $$z_i = v_i^r \mod N \ (1 \leq i \leq M)$$

with the object of sharing a key K in common with the limited receivers;

making the multi-address transmission of $z_i$ (1≦i≦M), wherein $$p_x = g \sum_{i=1}^{d} u_{x,\tau(i)} s_{x,\tau(i)} h_{\tau(i)}(e_1, \ldots, e_n) \mod N;$$

and transmitting $u_{x,\tau}=(u_{x,\tau(1)}, u_{x,\tau(2)}, \ldots, u_{x,\tau(d)})$ to the limited receivers, and (2) said receiver $\underline{x}$ side is provided with:

a step of calculating the common key K from the broadcast communication data, said confidential information $s_{x,\tau}$ of the receiver $\underline{x}$ distributed by the broadcasting station and $u_{x,\tau}$ in accordance with $$K = \prod_{i=1}^{d} z_{\tau(i)} u_{x,\tau(i)} s_{x,\tau(i)} \mod N,$$

and wherein

Z represents a set of the whole of integers;

lcm(a,b) represents the lowest common multiple of integers $\underline{a}$ and $\underline{b}$; and $\text{ord}_p(g)$ represents the least integer x which satisfies $g^x \equiv 1 \pmod p$.

29. A key distribution method according to claim 23, wherein (i) as a preparatory process, said broadcasting station side is provided with the steps of:

generating $P_{i, Qi}$:prime number (1≦i≦m)

$e_i \in Z$; 0<ei<L=lcm ($L_1, L_2, \ldots, L_m$) (1≦i≦n)

as confidential information of the broadcasting station; generating

• $N_i = P_i Q_i$ (1 ≤ i ≤ m)

• $g_i \in Z$; 0 < $g_i$ < M (1 ≤ i ≤ M)

• $N = \prod_{i=1}^{m} N_i$

• $V = (v_{ij})$, $v_{ij} = g_i h_j(e_1, \ldots, e_n) \mod N$ (1 ≤ i, j ≤ M)

as public information of the broadcasting station;

storing said confidential information and said public information of the broadcasting station into storage means;

generating random numbers r' (0<r'<L);

acquiring key information of the broadcasting station for $\sigma_x=(\sigma_{x,1}, \ldots, \sigma_{x,a}) \in S$, $\sigma'_{x,1}, \ldots, \sigma'_{x,a}) \in T$ from said storage means of said broadcasting station side to calculate $S_{\sigma_x}=((S\sigma_{x,1(1)}, S_{\sigma_{x,1}(2)}, \ldots, S_{\sigma_{x,1}(k)}), \ldots, (S_{\sigma_{x,a}(1)}, S_{\sigma_{x,a}(2)}, \ldots, S_{\sigma_{x,a}(k)}))$, $u_{\sigma_x}=((u_{\sigma_{x,1}(1)}, u_{\sigma_{x,1}(2)}, \ldots, u_{\sigma_{x,1}(k)}), \ldots, (u_{\sigma_{x,a}(1)}, u_{\sigma_{x,a}(2)}, \ldots, u_{\sigma_{x,a}(k)}))$ satisfying $$\sum_{i=1}^{k} u_{\sigma_{x,j}(i)} s_{\sigma_{x,j}(i)} h_{\sigma_{x,j}(i)}(e_1, \ldots, e_n) \equiv r \,(\mathrm{mod}\, L_{\sigma'_{x,j}})$$

(1 ≤ j ≤ a);

and distributing $s_{\sigma_x}$ and $$N_{\sigma'_{x,i}} = \prod_{j=1}^{d} N_{\sigma'_{x,i}(j)},$$

as key information of the receiver $\underline{x}$, wherein $$L_{\sigma'_{x,i}} = \mathrm{ord}_{N_{\sigma'_{x,i}}}\left(\prod_{j=1}^{k} g_{\sigma_{x,i}(j)}\right), \ (i = 1, \ldots, a); \ h_i(X_1, \ldots, X_n)$$

(i=1, . . . , a); $h_i(X_1, \ldots, X_n)$ (1≦i≦M) represents a monomial of $X_1, \ldots, X_n$ on Z; for set S(M)={$\sigma=(\sigma_1, \ldots, \sigma_a)$|one-to-one map $\sigma_i$:A={1, 2, . . . , k}→B={1, 2, . . . , M}(i=1, . . . , a), $\sigma_1(A) \cup \ldots \cup \sigma_a(A)=B$, M=ak}, $\sigma=(\sigma_1, \ldots, \sigma_a)$, $\sigma'=(\sigma'_1, \ldots, \sigma'_a) \in S(M)$, a relation of $$\sigma \sim \sigma' \overset{def}{\Longleftrightarrow} \{\sigma_1(A), \ldots, \sigma_a(A)\}$$

. . . , $\sigma_a(A)$}={$\sigma'_1(A), \ldots, \sigma'_a(A)$} is defined and a quotient set of S(M) concerning "~" is defined as S; and a quotient set of m=ad, S(m) concerning "~" is defined as T, and (ii) as a key distribution process, (1) said broadcasting station side is provided with the steps of:

randomly selecting for any receiver $\underline{x}$ an integer r (0<r<L) which satisfies $$K = \left(\prod_{i=1}^{M} g_i\right)^{rr'} \bmod N,$$

$$0 < \left(\prod_{j=1}^{k} g_{\sigma_{x,i}(j)}\right)^{rr'} \bmod N \leq \min\{N_{\sigma'_{x,i}} \mid \forall x, \sigma'_x\}$$

$(i = 1, \ldots, a)$ acquiring the key information of the broadcasting station from said storage means of said broadcasting station side to calculate $W=(w_{ij}), w_{ij}{}^r \bmod N \ (1 \leq i,j \leq M)$ with the object of sharing a key K in common with the limited receivers;
making the multi-address transmission of W; and
transmitting $u_{\sigma_x}=((u_{\sigma_{x,1}(1)}, u_{\sigma_{x,1}(2)}, \ldots, u_{\sigma_{x,1}(k)}), \ldots, (u_{\sigma_{x,a}(1)}, u_{\sigma_{x,a}(2)}, \ldots, u_{\sigma_{x,a}(k)}))$ to the limited receivers, and (2) said receiver $\underline{x}$ side is provided with:
a step of calculating the common key K from the broadcast communication data, said confidential information $s_{\sigma_x}$ of the receiver $\underline{x}$ distributed by the broadcasting station and $u_{\sigma_x}$ in accordance with $$K = \prod_{i=1}^{a} k_i \bmod N,$$

wherein $$K_t = \prod_{i=1}^{k}\left(\prod_{j=1}^{k} w_{\sigma_{x,t}(j)\sigma_{x,t}(i)}\right)^{u_{x,\sigma_{x,t}(i)}^{s}} \bmod N_{\sigma'_{x,t}}$$

$(1 \leq t \leq a)$, and wherein
Z represents a set of the whole of integers;
lcm(a,b) represents the lowest common multiple of integers $\underline{a}$ and $\underline{b}$; and
ord$_N(g)$ represents the least integer $\underline{x}$ which satisfies $g^x \equiv 1 \pmod{N}$ for integers N and $\underline{g}$.

30. A key distribution method according to claim 26, wherein said key generator side is further provided with a step of selecting the key information $s_{x,t}$ of the receiver $\underline{x}$ to satisfy a condition of $\pi_x \neq g$ for any receiver $\underline{x}$.

31. A key distribution method according to claim 26, wherein said key generator side is further provided with a step of selecting the key information $s_{\sigma_x}$ of the receiver $\underline{x}$ to satisfy so that $$\sum_{i=1}^{k} u_{\sigma_{x,j}(i)} s_{\sigma_{x,j}(i)} h_{\sigma_{x,j}(i)}(e_1, \ldots, e_n) \not\equiv r' \pmod{\check{L}_{\sigma'_{x,j}}}$$

$$\check{L}_{\sigma'_{x,j}} = lcm\left(ord_{N_{\sigma'_{x,j}}}(g_{\sigma_{x,j}(1)}), \ldots, ord_{N_{\sigma'_{x,j}}}(g_{\sigma_{x,j}(k)})\right)$$

$(j = 1, \ldots, a)$ is satisfied.

32. A key distribution method according to claim 29, wherein said broadcasting station side is further provided with a step of selecting the key information $s_{\sigma_x}$ of the receiver $\underline{x}$ to satisfy so that $$\sum_{i=1}^{k} u_{\sigma_{x,j}(i)} s_{\sigma_{x,j}(i)} h_{\sigma_{x,j}(i)}(e_1, \ldots, e_n) \not\equiv r' \pmod{\check{L}_{\sigma'_{x,j}}}$$

$$\check{L}_{\sigma'_{x,j}} = lcm\left(ord_{N_{\sigma'_{x,j}}}(g_{\sigma_{x,j}(1)}), \ldots, ord_{N_{\sigma'_{x,j}}}(g_{\sigma_{x,j}(k)})\right)$$

$(j = 1, \ldots, a)$ is satisfied.

33. A key distribution method according to claim 28, wherein said broadcasting station side is further provided with a step of changing the value of the common key K by changing the value of $\underline{r}$ of the common key K=$g^{rr'}$ mod N.

34. A key distribution method according to claim 28, wherein said broadcasting station side is further provided with a step of identifying transmit data by taking the value of r' of the common key K=$g^{rr'}$ mod N as a value characteristic of the transmit data.

35. A key distribution method according to claim 28, wherein the limited receiver $\underline{x}$ side is provided with a step of making the authentication for the broadcasting station side by use of the confidential information $s_{x,\tau'}$ and a step of receiving $u_{x,\tau'}$ after the authentication is made, and wherein the broadcasting station side is provided with a step in which in the case where data P enciphered using the common key K is onerous indicating that a fee is charged, a process for account of a charge for P to the receiver $\underline{x}$ is performed.

36. A key distribution method according to claim 28, wherein in the case where the receiver $\underline{x}$ possesses a storage medium with a computing function having the confidential key $s_{x,\tau}$ and connects said storage medium to a receiving unit having a higher computing function to calculate the common key $$K = \prod_{i=1}^{d} z_{\tau(i)}^{u_{x,\tau(i)} s_{x,\tau(i)}} \bmod N$$

there comprises:
a step of performing the calculation of $\xi_{x,\tau(i)} = z_{\tau(i)}^{u_{x,\tau(i)}} \bmod N \ (1 \leq i \leq d)$;

by said receiving unit;
a step of outputting $\xi_{x,\tau(i)}$ ($1 \leq i \leq d$) from said receiving unit to said storage medium;
a step of performing the calculation of $\eta_{x,\tau(i)} = \xi_{x,\tau(i)}^{s_{x,\tau(i)}} \bmod N \ (1 \leq i \leq d)$ by said storage medium on the basis of information from said receiving unit;
a step of outputting $\eta_{x,\tau(i)}$ ($1 \leq i \leq d$) from said storage medium to said receiving unit; and
a step of performing the calculation of $$K = \prod_{i=1}^{d} \eta_{x,\tau(i)} \bmod N$$

by said receiving unit on the basis of information from said storage medium.

37. A key distribution method according to claim 29, wherein in the case where the receiver x possesses a storage medium with a computing function having the confidential key $s_{o_x}$ and connects said storage medium to a receiving unit having a higher computing function to calculate the common key K, the transfer of information between said storage medium and said receiving unit is made with a step of performing a calculation using confidential information in said storage medium and a step of performing a calculation using no confidential information in said receiving unit.

38. A key distribution method according to claim 23, wherein (i) as a preparatory process,
said broadcasting station side is provided with the steps of:
generating
P, Q:prime number
$e_i \in Z$, $0 < e_i < L = lcm(P-1, Q-1)$ ($1 \leq i \leq m$)
as confidential information of the broadcasting station;
generating
N=PQ
as public information of the broadcasting station;
storing said confidential information and said public information of the broadcasting station into storage means;
generating random numbers $r \in Z$, $\pi=(\pi_1, \ldots, \pi_l) \in R_{k,n}$;
acquiring key information of the broadcasting station for $\sigma=(\sigma 1, \ldots, \sigma_l) \in S_{k,n}$ from said storage means of said broadcasting station side to calculate
$S_{x,(\pi,\sigma)}=(S_{x,\pi_1(1)}, \ldots, S_{x,\pi_1(h)}, \ldots, S_{x,\pi_l(1)}, \ldots, S_{x,\pi_l(h)})$,
$r_{x,(\pi,\sigma)}=(r_{x,\pi_1(1)}, \ldots, r_{x,\pi_1(h)}, \ldots, r_{x,\pi_l(1)}, \ldots, r_{x,\pi_l(h)})$
satisfying $$\sum_{i=1}^{h} r_{x,\pi_i(j)} s_{x,\pi_i(j)} e_{\pi_i(j)} \equiv r'(\text{mod} L_{\sigma_i})$$

$(1 \leq i \leq l);$ and a step of distributing $s_{x,(\pi,\sigma)}$ as key information of the receiver x, wherein $$L_{\sigma_i} = ord_N \left( \prod_{j=1}^{k} g_{\sigma_i(j)} \right) \quad (1 \leq i \leq l);$$

when $\sigma=(\sigma_1, \ldots, \sigma_l)$, $\sigma'_1=(\sigma'_1, \ldots, \sigma'_l)$, $\in S'_{k,n}$ for n=kl, set $R_{k,n}=\{\pi=(\pi_1, \ldots, \pi_l)|\text{one-to-one map } \pi_i:\{1, 2, \ldots, h\} \rightarrow \{1, 2, \ldots, m\}, (1 \leq i \leq l, 1 \leq h \leq m)\}$, set $S'_{k,n}=\{\sigma=(\sigma_1, \ldots, \sigma_l)|\text{one-to-one map } \sigma_i:A\{1, 2, \ldots, k\} \rightarrow B=\{1, 2, \ldots, n\}(1 \leq i \leq l), \sigma_1(A) \cup \ldots \cup \sigma_l(A)=B\}$, a relation of $$\sigma \sim \sigma' \stackrel{def}{\Longleftrightarrow} \sigma_i(A) = \sigma'_{\tau(i)}(A) \quad (1 \leq i \leq l)$$

is defined in regard to proper permutation τ on a set $\{1, 2, \ldots, l\}$, "~" representing an equivalent relation on $S'_{k,n}$ and $S_{k,n}$ being $S_{k,n}=S'_{k,n}/\sim$, and (ii) as a key distribution process, (1) said broadcasting station side is provided with the steps of:
randomly selecting $r \in Z$ for $g_i \in Z$ ($0 < g_i < N$, $1 \leq i \leq n = kl$) in said storage means of said broadcasting station side;
calculating $$K = \prod_{i=1}^{n} g_i^{rr'} \text{mod} N$$

acquiring the key information of the broadcasting station from said storage means of said broadcasting station side to calculate $y_{ij}=u_{ij}^{r'} \mod N$ ($1 \leq i \leq m$, $1 \leq i \leq n$)

with the object of sharing a key K in common with only the limited receivers;
making the multi-address transmission of $y_{ij}$ ($1 \leq i \leq m$, $1 \leq j \leq n$); and
transmitting $r_{x,(\pi,\sigma)=(rx,\pi(1)}, \ldots, r_{x,\pi_1(h)}, \ldots, r_{x,\pi_l(1)}, \ldots, r_{x,\pi_l(h)})$ to the limited receivers x, and (2) said receiver x side is provided with:
a step of calculating the common key K from the broadcast communication data, said confidential information $s_{x,(\pi,\sigma)}$ of the receiver x distributed by the broadcasting station and $r_{x,(\pi,\sigma)}$ in accordance with $$K = \prod_{i=1}^{l} \prod_{p=1}^{h} \prod_{q=1}^{k} y_{\pi_i(p)\sigma_i(q)} r_{x,\pi_i(p)} s_{x,\pi_i(p)} \text{mod} N,$$

and wherein

Z represents a set of the whole of integers;

lcm(a,b) represents the lowest common multiple of integers a and b; and $ord_N(g)$ represents the least positive integer x which satisfies $g^x \equiv 1 (\mod N)$ for integers N and g.

39. A key distribution method according to claim 28, wherein said broadcasting station side is further provided with a step of selecting the key information $s_{x,\pi}$ of the receiver x to satisfy a condition of $\pi_x \neq g$ for any receiver x.

40. A key distribution method according to claim 29, wherein said broadcasting station side is further provided with a step of changing the value of the common key K by changing the value of r of the common key $K=g^{rr'} \mod N$.

41. A key distribution method according to claim 29, wherein said broadcasting station side is further provided with a step of identifying transmit data by taking the value of r' of the common key $K=g^{rr'} \mod N$ as a value characteristic of the transmit data.

42. A key distribution method according to claim 29, wherein the limited receiver x side is provided with a step of making the authentication for the broadcasting station side by use of the confidential information $s_{ox}$ and a step of receiving $u_{ox}$ after the authentication is made, and wherein the broadcasting station side is provided with a step in which in the case where data P enciphered using the common key K is onerous indicating that a fee is charged, a process for account of a charge for P to the receiver x is performed.

* * * * *